United States Patent [19]
Dzyck et al.

[11] Patent Number: 6,152,609
[45] Date of Patent: Nov. 28, 2000

[54] PLUG CONNECTOR FOR LIGHT WAVEGUIDES AND METHOD FOR THE MANUFACTURE THEREOF

[75] Inventors: Wolfgang Dzyck, Meeder; Helmar Krupp, Gevelsberg; Rainer Zimmer, Schalksmuehle; Rainer Kossat, Aschau; Heinz Glaser, Germering, all of Germany

[73] Assignee: Siemens Aktiengesellschaft, Munich, Germany

[21] Appl. No.: 09/258,724

[22] Filed: Feb. 26, 1999

[30] Foreign Application Priority Data

| | | | |
|---|---|---|---|
| Feb. 20, 1998 | [DE] | Germany | 198 12 313 |
| Feb. 27, 1998 | [DE] | Germany | 198 08 522 |
| Mar. 19, 1998 | [DE] | Germany | 198 12 200 |

[51] Int. Cl.⁷ .................................................. G02B 6/36
[52] U.S. Cl. ................. 385/86; 385/77; 385/70
[58] Field of Search .................. 385/86, 53–60, 385/62–73, 77, 78, 80, 81, 84, 87, 139

[56] References Cited

U.S. PATENT DOCUMENTS 5,611,012  3/1997  Kuchenbecker ................... 385/86

FOREIGN PATENT DOCUMENTS 195 17 750  11/1996  Germany .
WO 95/07479  3/1995  WIPO .

Primary Examiner—Phan T. H. Palmer
Attorney, Agent, or Firm—Schiff Hardin & Waite

[57] ABSTRACT

A plug connection for connecting a light waveguide to a plug has a plug member with a connecting light waveguide extending from one side thereof having an end being spliced to a light waveguide of a light waveguide cable and at least one strain relief element being passed over the splice and connected to the plug member. The method of forming the plug connection includes providing a sufficient length of both the connecting light waveguide extending from the plug member and the light waveguide of the cable so that a connection in a normal, known splicing apparatus can be obtained outside of the position of the plug member and then conducting the strain relief element over the splice region and connecting it to the plug member.

60 Claims, 13 Drawing Sheets

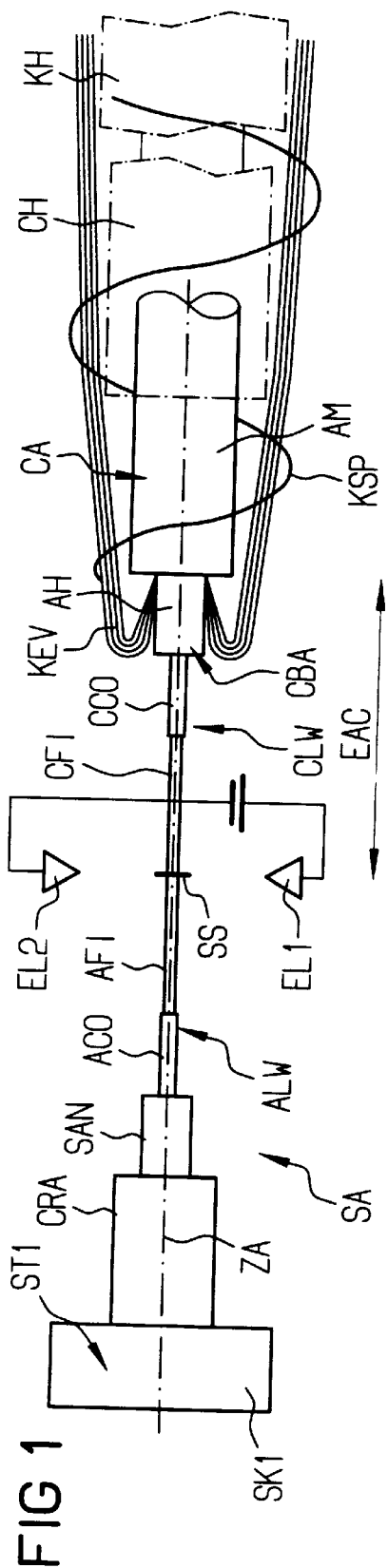
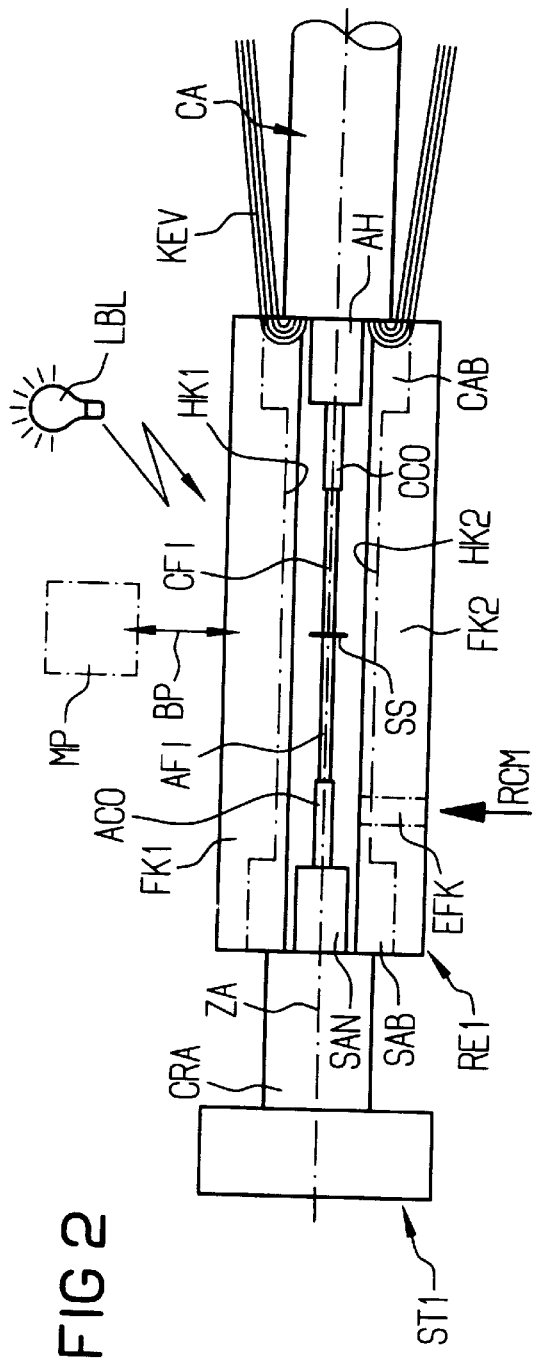
FIG 1
FIG 2

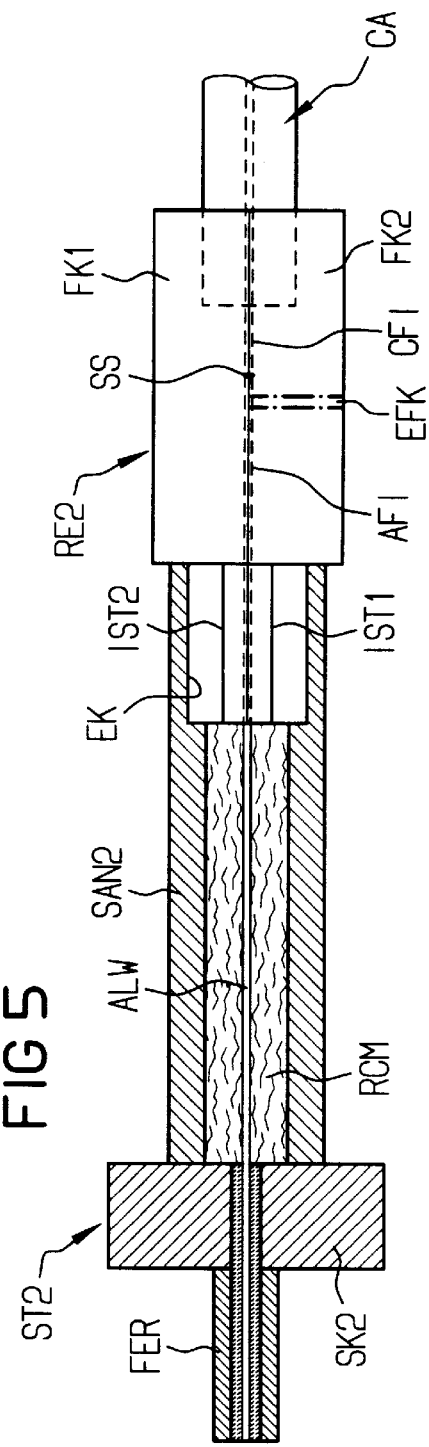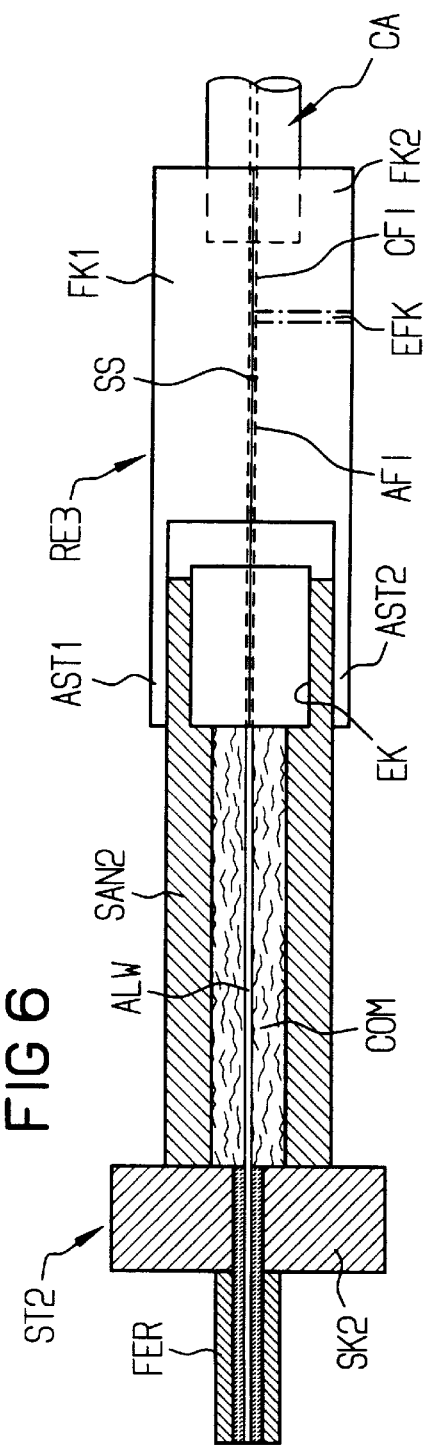

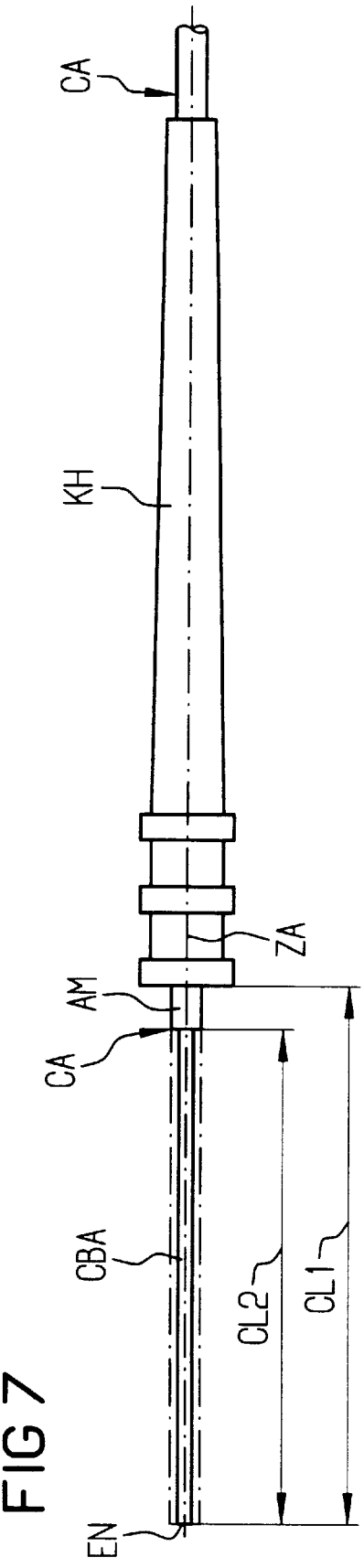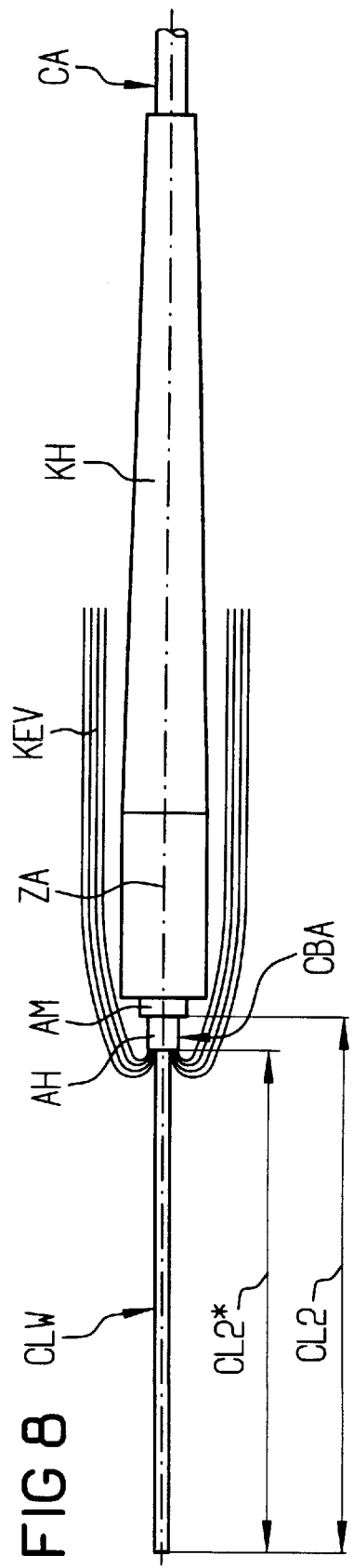

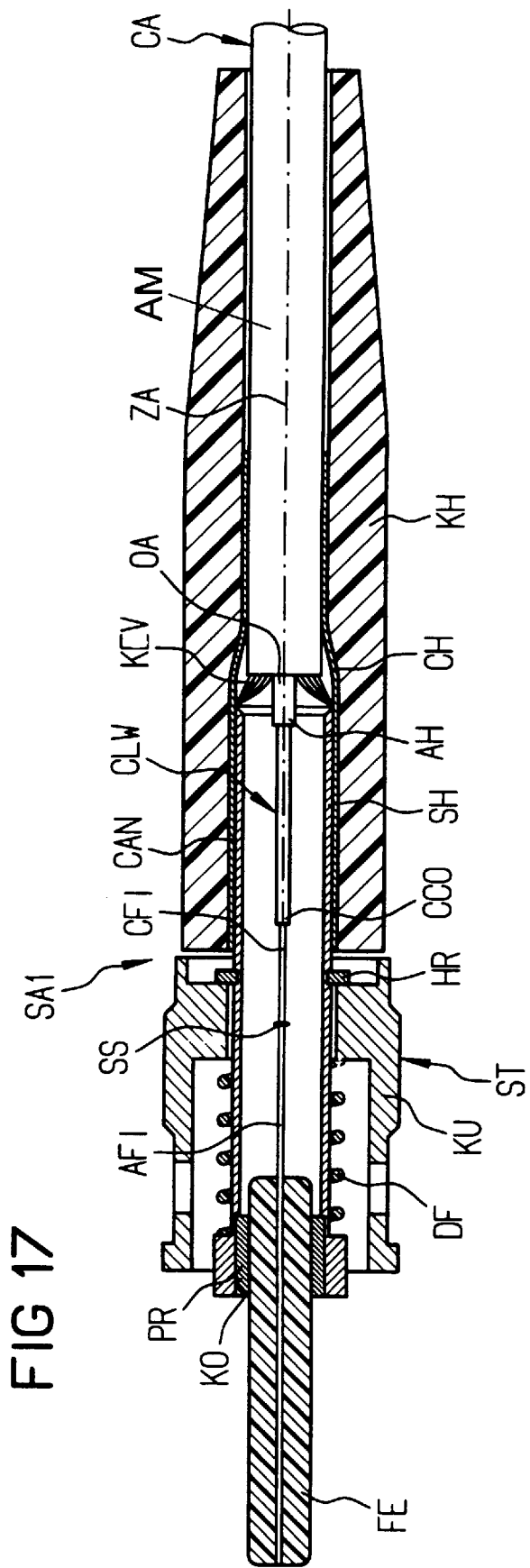

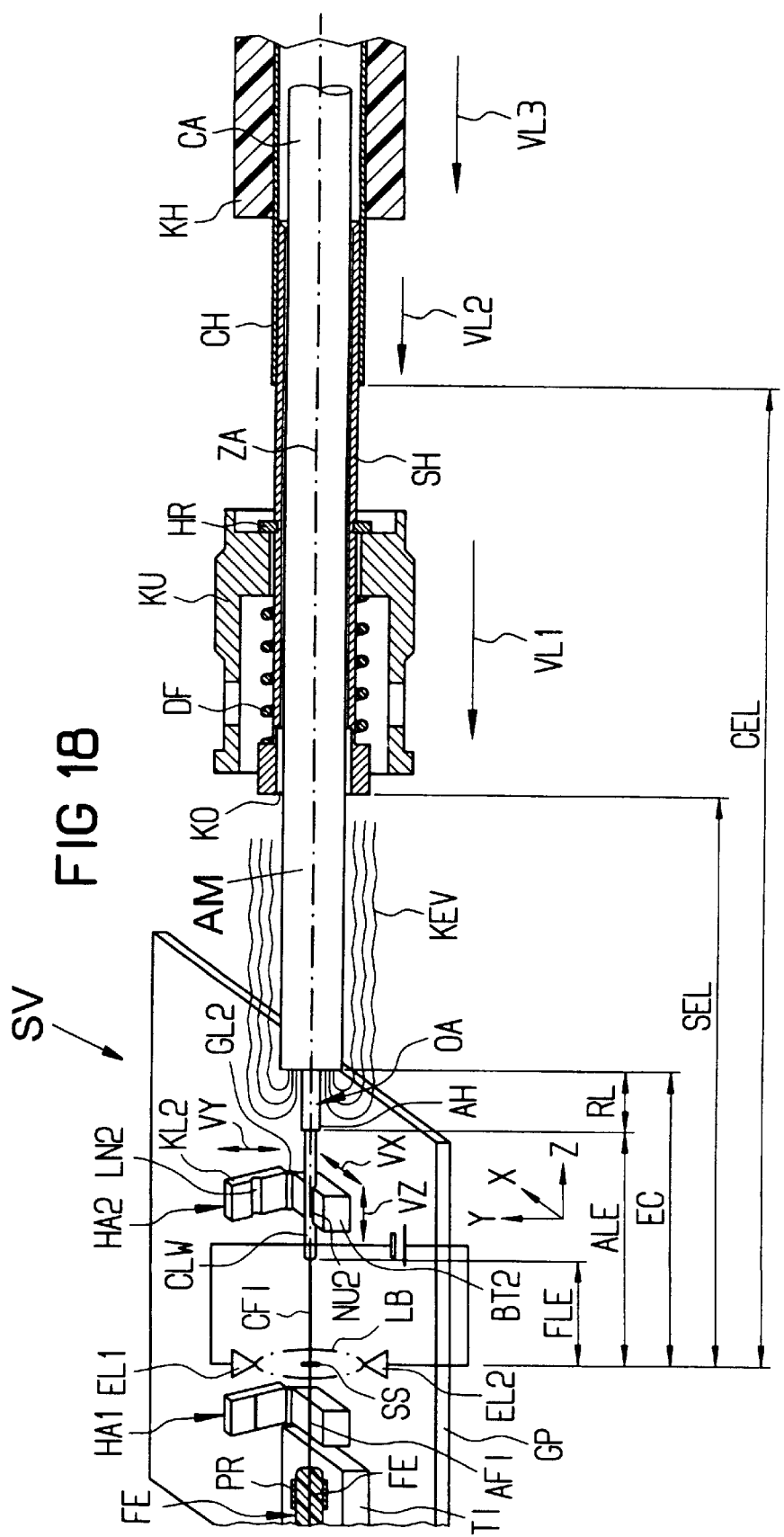

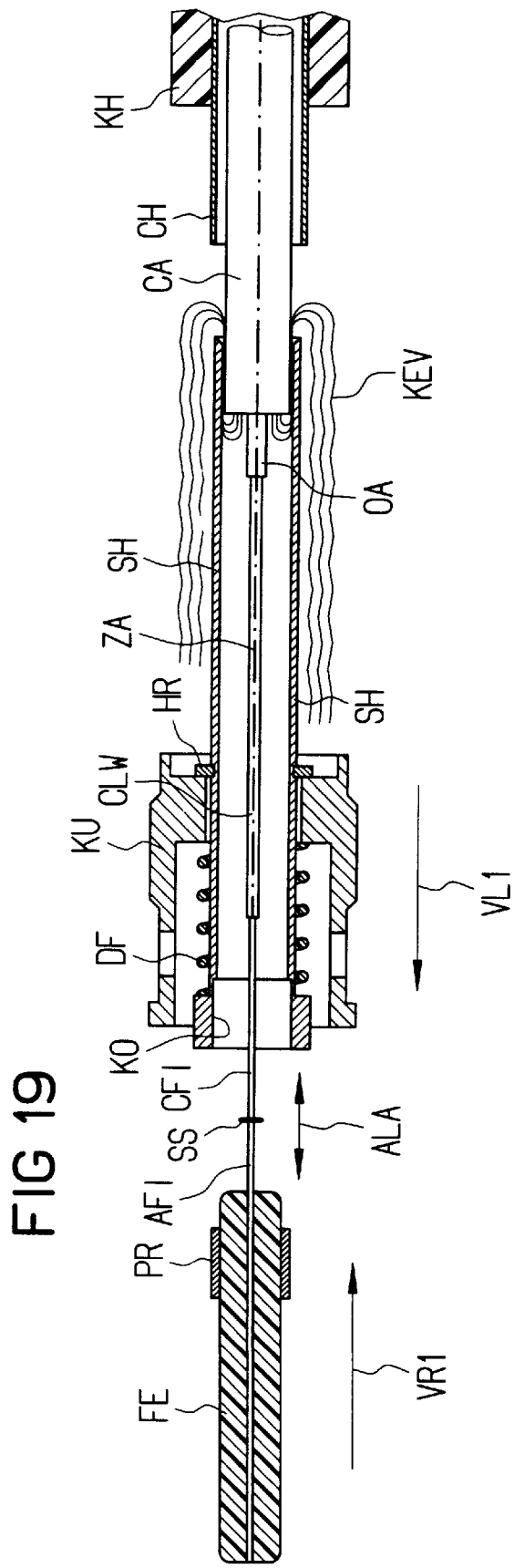

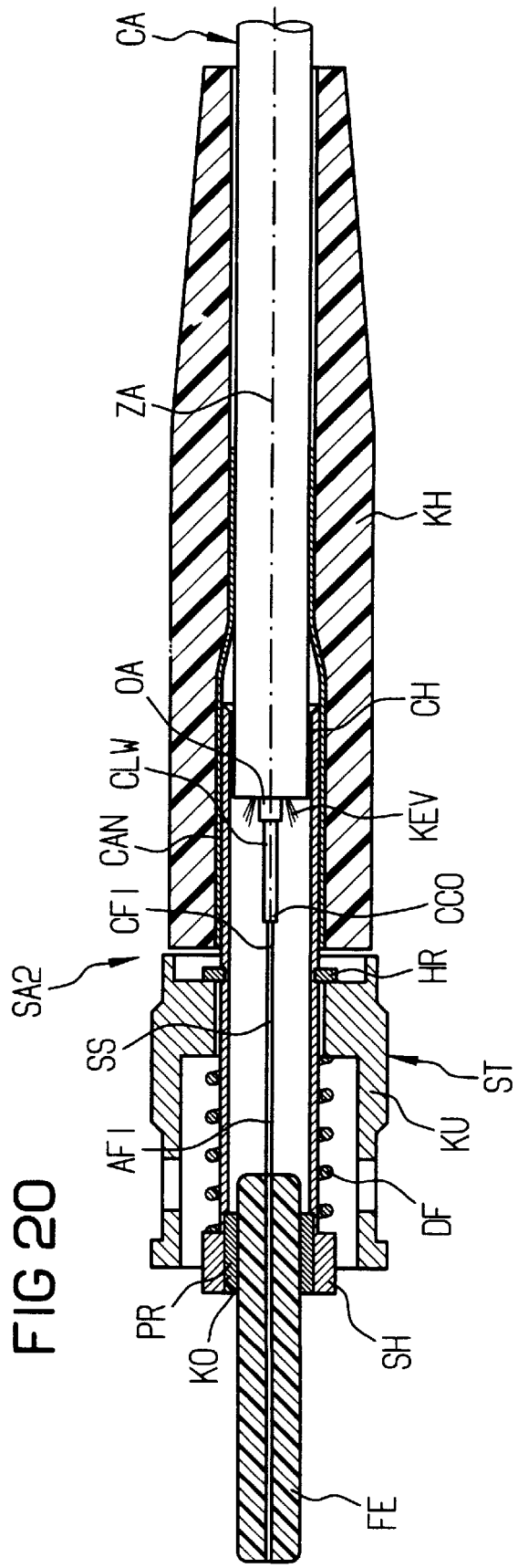

PLUG CONNECTOR FOR LIGHT WAVEGUIDES AND METHOD FOR THE MANUFACTURE THEREOF

BACKGROUND OF THE INVENTION

The invention is directed to a plug connector for light waveguides.

DE 195 17 750 A1 discloses a light waveguide plug that is pre-fabricated with a light waveguide in its central bore. A first light waveguide, which is to be spliced, is introduced into the central bore of the plug. The plug comprises a transverse bore for the acceptance of welding electrodes with whose assistance the first light waveguide can be welded to a pre-fixed light waveguide ending in the central bore of the plug. Such a specific electrode arrangement is usually not available in standard light waveguide welding apparatus. Further, particularly in practical field employment, it can be difficult to thread this first light waveguide into the central bore of the plug and to contact an end thereof with the end face of the pre-fixed light waveguide.

WO 95/07479 discloses a pre-assembled plug connector for an optical cable. The optical fiber of the cable can merely be threaded into the longitudinal bore of the already completely assembled plug connector. As a result thereof, the fixing of the plug connector at the cable is made more difficult. Further, the sensitive optical fiber can be damaged during the threading operation or step. It is also difficult to precisely position the optical fiber in such a plug connector that is already assembled.

SUMMARY OF THE INVENTION

The invention is based on the object of disclosing a way of how a light waveguide plug can be attached to a light waveguide cable in a simple and dependable way. This object is inventively achieved in a plug of the species initially cited in that the connector light waveguide extends out of the plug to such an extent that it can be spliced at its end face outside the plug to a light waveguide of a light waveguide cable to form the splice, and that at least one strain relief element of the cable can be conducted past the splice location to the plug and coupled thereto so that a strain relief is offered for the splice location.

As a result thereof, a plug can be mounted to a light waveguide cable under a multitude of practical conditions and in a simple as well as dependable way. Since the splice between the light waveguides of the light waveguide cable and the connecting light waveguide of the plug lies outside the plug, assembly by the welding process is simplified.

In particular, for example, standard plugs with a respectively pre-fabricated light waveguide can be employed. Over and above this, the plug connector can be advantageously manufactured in a standard light waveguide welding apparatus, since both the connecting light waveguide as well as the light waveguide disengaged from the light waveguide cable can be placed into the already existing components of such a light waveguide welding apparatus. Since the strain relief elements of the light waveguide cable are conducted up to the plug over the finished splice location and are fixed to the plug, an adequate strain relief for the plug as well as for the splice location is already advantageously adequately offered merely by these strain relief elements that are already present and without requiring additional strain relief elements.

The invention is also directed to a plug connector for a light waveguide of a light waveguide cable upon employment of a plug that comprises a connecting light waveguide. The connecting light waveguide of the plug connector extends out of the plug to such an extent that it can be spliced at the end face outside the plug to the light waveguide of the light waveguide cable to form a splice, and that at least one strain relief element of the light waveguide cable can be conducted over the splice location to the plug and can be coupled to the plug so that a strain relief is offered for the splice location.

The invention is directed to another plug connector for a light waveguide of a light waveguide cable upon employment of a plug that comprises a connecting light waveguide, whereby the connecting light waveguide extends out of the plug to such an extent that it can be spliced outside the plug with the end face of a light waveguide of the light waveguide cable during formation of a splice, and whereby at least one strain relief element of the light waveguide cable can be conducted past the splice location to the plug and can be coupled to the latter such that a strain relief is offered for the splice location, whereby the connecting light waveguide extends out of the plug to such a length that it, together with its plug, can be placed into at least one receptacle device of a light waveguide splicing apparatus.

The invention is also directed to another plug connector for at least one light waveguide of a light waveguide cable upon employment of a plug, whereby a plug sleeve is provided that can be slipped onto the light waveguide cable to such an extent that a prescribable end section of the light waveguide cable has its end face projecting out of the plug sleeve, that a separate plug pin is provided in which at least one prepared connecting optical fiber is held and extends out therefrom with a prescribable longitudinal section, and whereby the plug pin can be plugged into the plug sleeve upon formation of an optical plug so that the plug sleeve surrounds the connecting optical fiber and at least one optical fiber separated from the light waveguide from the outside after they are spliced.

The invention is also directed to a method for manufacturing a plug connector for a light waveguide of a light waveguide cable upon employment of a plug that comprises a connecting light waveguide. The method comprises steps wherein the light waveguide is separated out from the light waveguide cable at the end with a prescribable longitudinal section, that this light waveguide as well as the connecting light waveguide extending out of the plug at the cable connecting side are respectively decoated along a prescribable end section, so that their optical fibers are exposed thereat, that these two optical fibers are spliced to one another at their end faces outside the plug during formation of a splice location, and that at least one strain relief element of the light waveguide cable is conducted past the splice location to the plug and coupled thereto so that a strain relief is offered for the plug in a longitudinal direction while bridging the splice location.

The invention is also directed to a method for manufacturing a plug connector for a light waveguide of a light waveguide cable upon employment of a plug that comprises a connecting light waveguide, whereby the light waveguide is separated out from the light waveguide cable at the end with a prescribable longitudinal section, whereby this light waveguide as well as the connecting light waveguide extending out from the plug at the cable connections side are respectively decoated along a prescribable end section, so that their optical fibers lie exposed thereat, whereby these two optical fibers are spliced to one another at their end faces outside the plug during formation of a splice location, and at least one strain relief element of the light waveguide cable is conducted past the splice location to the plug and is coupled thereto so that a strain relief is offered for the plug in a longitudinal direction while bridging the splice location.

The invention is also directed to a method for attaching a plug to a light waveguide cable that is characterized in that a plug sleeve is slipped onto the light waveguide cable to such an extent that a prescribable end section of the light waveguide cable projects from the plug sleeve at the end face, that at least one optical fiber from this projection end section of the light waveguide cable is uncovered over a prescribable length, that at least one connecting optical fiber is kept prepared in a separate plug pin and extends out of this pin with a prescribable longitudinal section, that the optical fiber of the light waveguide cable projecting from the plug sleeve and the allocated connecting optical fiber extending out of the plug pin have their end faces aligned to one another and are spliced to one another at a freely accessible splice location outside the plug sleeve and outside the plug pin, that the plug sleeve is slipped over the optical fibers spliced to one another after the splice is produced, and that only then is the plug pin plugged into the plug sleeve upon formation of a plug.

Modifications of the invention are also directed to: a plug connector wherein the subsequent coating viewed in a cable longitudinal direction preferably extends essentially from the shank of the plug up to the outside cladding of the light waveguide cable;

a plug connector wherein a curable resin is particularly suited as a re-coating material;

a plug connector wherein the longitudinal extent of the crimp sleeve is preferably selected so that both the shank of the plug as well as the outside cladding of the light waveguide cable can be grasped by the crimp sleeve;

a plug connector wherein the strain relief elements are particularly fixed on the shank end of the plug with the assistance of a crimp sleeve;

a plug connector wherein the connecting light waveguide is preferably fixed in the plug;

a plug connector wherein a shrink hose is provided as a splice protection sheath;

a method wherein a re-coating material is preferably applied around the outside of the decoated optical fibers after the splice is produced and this re-coating material largely corresponding to the original coating material of the light waveguide;

a method wherein the re-coating material, viewed in cable longitudinal direction, is preferably applied essentially from the shank end of the plug up to the outside cladding of the light waveguide cable;

a method wherein, in particular, the gap between the shank end of the plug and the outside cladding of the light waveguide cable is filled with the re-coating material so that a replacement sleeve occurs for the spliced-together optical fibers and the outside diameter of the replacement sleeve approximately corresponding to the outside diameter of the light waveguide cable to be connected;

a method wherein the re-coating material is preferably cured after the re-coating of the optical fibers;

a method wherein the strain relief elements of the light waveguide cable are advantageously conducted past the splice location to the plug and placed on the shank end thereof after the re-coating of the optical fiber;

a method wherein the strain relief elements are particularly fixed on the shank end of the plug with the assistance of a crimp sleeve;

a method wherein the crimp sleeve is preferably slipped onto the outside cladding of the light waveguide cable in advance before the connecting step;

a method wherein, in particular, an anti-buckling sheath is slipped onto the outside cladding of the light waveguide cable in advance before the connecting step;

a method wherein the anti-buckling sleeve is preferably slipped over the crimp sleeve up to the plug after the attachment of the crimp sleeve;

a method wherein the strain relief elements from the light waveguide cable are preferably separated with a length that corresponds at least to the longitudinal spacing between the outside cladding of the light waveguide cable and the shank of the plug after the splicing of their two light waveguides;

a method wherein the plug is preferably already prefabricated with the connecting light waveguide at a factory;

a method wherein the connecting light waveguide of the plug is preferably prepared in advance so that it extends out of the plug with such a great end length that it, together with the plug, can be placed into at least one receptacle device of a light waveguide splicing apparatus;

a method wherein the light waveguide is released from the light waveguide cable to such a great length that this released light waveguide section can be placed into at least one receptacle device of a light waveguide splicing apparatus;

a method wherein a splice protection sheath is slipped over the uncovered optical fibers as a first, inner covering sheath, particularly after the end-face welding thereof;

a method wherein a shrink hose is preferably employed and is shrunk over the splice location and the uncovered longitudinal sections of the optical fibers welded to one another;

a method wherein the splice protection sheath is slipped in advance onto the end section of the connecting light waveguide extending out of the plug before the end face thereof is prepared and is kept on hand thereat;

a method wherein a crimp sleeve is slipped over the connecting light waveguide extending out of the plug in advance before the preparation of the end face thereof and is kept on hand thereat;

a method wherein a strain relief element of the light waveguide cable is fixed at the shank end of the plug with the crimp sleeve;

a method wherein the light waveguide cable as well as the plug attached to the end side thereof are advantageously placed into an assembly auxiliary means for enveloping the optical fibers welded to one another, the plug as well as the light waveguide cable being held fast in the auxiliary means so that the separated light waveguide cable as well as a the spliced-on connecting light waveguide of the plug extend essentially on a straight line;

a method wherein a greater overall length for the optical fibers, which are welded to one another is preferably selected in the region between the plug and the breakage edge of the outside cladding of the light waveguide cable than for the strain relief elements placed thereover;

a method wherein a ferrule is preferably employed as a plug pin;

a method wherein the plug sleeve is fixed to at least one covering sheath of the light waveguide cable to be connected after being slipped over the finished splice;

a method wherein the plug sleeve is slipped over the splice in the direction of the plug pin to such an extent that the plug sleeve envelops a sub-section of the outside cladding of the light waveguide cable at the cable connecting side;

a method wherein the plug sleeve is preferably slipped over the splice in the direction of the plug pin to such an extent that the plug sleeve ends in that region at the cable connecting side where strain relief elements emerge from the cladding structure of the light waveguide cable set back along an end section;

a method wherein strain relief elements of the light waveguide cable are arranged over and/or on the plug sleeve;

a method wherein a crimp sleeve is slipped on at the outside over the plug sleeve provided with the strain relief elements and this crimp sleeve is pressed onto the plug sleeve, as a result whereof the strain relief elements are fixed thereon;

a method wherein the crimp sleeve is slipped onto the outside cladding of the light waveguide cable in advance, preferably before connection of the light waveguide cable to the plug;

a method wherein the anti-buckling sheath is preferably slipped over up to the plug head of the plug;

a method wherein the optical fiber of the light waveguide cable is preferably fusion-welded to the connecting optical fiber of the plug pin; and a method wherein the plug pin is inserted at that end face of the plug sleeve that lies opposite the light waveguide cable to be connected.

Other advantages and features of the invention will be readily apparent from the following description of the preferred embodiments, the drawings and claims.

BRIEF DESCRIPTION OF THE DRAWINGS

FIG. 1 is a schematic illustration of a prepared light waveguide cable having an uncovered light waveguide connected to a light waveguide plug in accordance with the present invention;

FIG. 2 is a schematic view of a means for re-coating the decoated, welded-together optical fiber ends of the plug and of the light waveguide cable of FIG. 1;

FIG. 5 is a schematic, longitudinal sectional view of a first modification of a re-coating means of FIG. 2;

FIG. 6 is a schematic, longitudinal sectional view of a second modification of the re-coating means of FIG. 2;

FIGS. 7 through 9 are schematic side views of various assembly steps for preparing a light waveguide cable for connection to a light waveguide plug;

FIG. 17 is a schematic magnified cross-sectional view of another exemplary embodiment of an inventive plug connection after assembly of the components thereof;

FIGS. 18 and 19 are schematic views of assembly steps for producing the plug connection of FIG. 17; and FIG. 20 is a cross-sectional view of a modified plug connection after assembly of its components.

DESCRIPTION OF THE PREFERRED EMBODIMENTS

Figure 3:
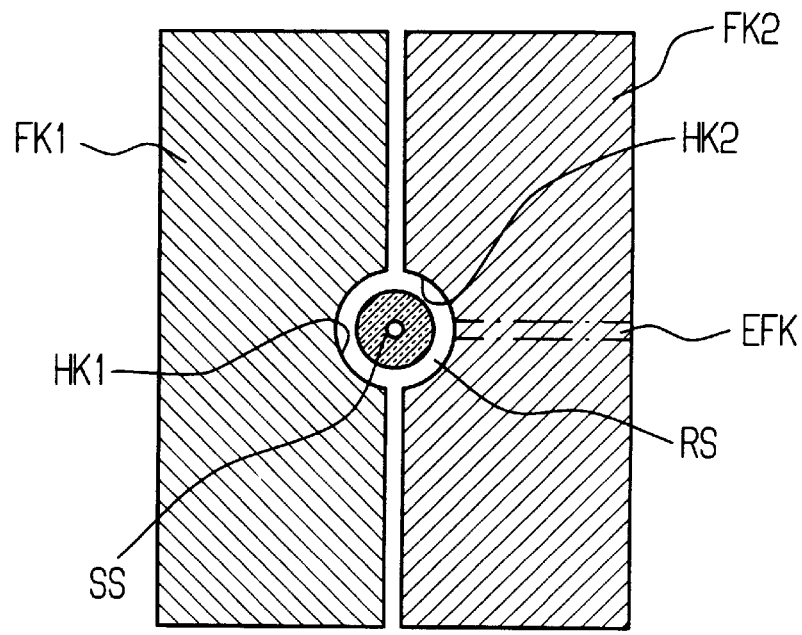
FIG. 3 is a schematic, cross-sectional view of the re-coating means of FIG. 2.

FIG. 1 schematically illustrates how, for example, a light waveguide cable CA can be fabricated and equipped at its end or, respectively, terminated, with, for example, a light waveguide plug ST1 according to the inventive principle. The light waveguide cable CA comprises an individual optical fiber CFI in its center having at least one plastic layer CCO (particularly, primary and secondary coating) surrounding it on all sides. A plastic sheath AH is extruded thereover, so that an optical lead CBA is formed. Strain relief elements KEV in the form of at least one sheath are applied on the outside surface of this optical lead CBA and the elements KEV preferably proceed in a longitudinal cable direction. Finally, at least one outside plastic cladding AM is seated on the optical lead CBA, which is covered with at least one ply of strain relief elements.

For fabricating this light waveguide cable CA with the plug ST1, a covering sheath or, respectively, sleeve or at least one other cladding element is initially slipped over the free end of the as yet unprepared light waveguide cable CA onto outside cladding AM thereof in a first method step. In FIG. 1, both a crimp sleeve CH as well as an anti-buckling sheath or, respectively, sleeve KH are applied by way of example onto the outside cladding AM of the light waveguide cable CA. The crimp sleeve CH as well as the anti-buckling sheath KH have a tubular shape, which is approximately circular-cylindrical-shaped. In FIG. 1, the crimp sleeve CH as well as the anti-buckling sheath KH are respectively merely indicated dot-dashed and only over a partial length of their overall longitudinal extent for the sake of graphic simplicity. The anti-buckling sheath KH is expediently slipped onto the outside cladding AM of the light waveguide cable CA proceeding from the free end farther than the crimp sleeve CH. In FIG. 1, the anti-buckling sheath KH is therefore seated offset farther toward the right on the outside cladding AM of the cable CA when compared to the crimp sleeve CH. The anti-buckling sheath KH expediently comprises a larger inside diameter than the crimp sleeve CH, so that it can be moved over the crimp sleeve CH. These two cladding elements serve the purpose of covering and mechanically reinforcing the splice region or, respectively, coupling region from the outside after the fact, i.e. after the splicing of the light waveguide cable CA to the optical plug ST1. The crimp sleeve CH as well as the anti-buckling sheath KH are respectively expediently slipped onto the light waveguide cable CA to such an extent that a prescribable end length EAC of the cable CA hangs out of the crimp sleeve CH and/or anti-buckling sheath KH and is thus freely accessible for an assembler or an operator for preparation.

After the crimp sleeve CH as well as the anti-buckling sheath KH have been pulled on over the light waveguide cable CA, the projecting end section EAC of the cable is decoated in layers from the outside towards the inside in a following method step. In detail, the outside cladding AM, particularly the plastic envelope of the cable CA, is thereby stripped off at the end portion over a prescribable longitudinal section. The outside cable cladding AM is preferably removed over a sub-length between 30 and 40 mm proceeding from the cable end. Due to the removal of the outside cable cladding AM, a plurality of strain relief elements KEV are uncovered immediately thereunder, and these elements cover the outside plastic sheath AH of the individual optical leads CBA. The strain relief elements KEV can be applied as a single-layer or a multi-layer on the approximately circular-cylindrical optical lead CBA in the form of a sheath. They preferably proceed along the longitudinal extent of the optical lead CA, particularly parallel to the central axis ZA of the lead CBA. Reinforcing fibers, particularly Kevlar threads or aramide yarns are preferably provided as strain relief elements KEV in the optical cable CA. The strain relief elements KEV uncover along the predetermined stripping length are expediently folded back onto the outside cladding AM of the cable CA in the opposite longitudinal direction. In particular, they are bent back by approximately 180° from their parallel course with reference to the central cable axis ZA immediately upon emerging from the outside plastic cladding AM at the cut or breakage edge thereof. The bent-back strain relief elements KEV are expediently laterally limited during the preparation of the end of the light waveguide cable CA and are preferably fixed to the outside cable cladding AM while the light waveguide cable CA is being spliced to the light waveguide plug. In FIG. 1, the bent-back strain relief elements KEV, for example are clamped fast at the outside cladding AM of the light waveguide cable CA with the assistance of an elongated plastic helix KSP additionally pulled over the outside cable cladding and are thus kept away from the end section of the cable which is to be prepared and this facilitates the assembly work thereat. The plastic helix KSP is preferable fashioned spring-elastic. It is expediently slipped far enough onto the outside cladding AM in advance, i.e. before the layer-by-layer decoating of the cable end section EAC. Its inside diameter is preferably selected approximately equal to the outside diameter of the light waveguide cable CA in order to be able to clamp the strain relief elements KEV fast on the outside cladding AM.

Subsequently, the outside plastic sheath AH of the optical lead CBA is pulled back over a prescribable end length proceeding from the face end of the cable. A residual length of the optical lead CBA separated from the outside cable cladding AM thereby continues to be clad by the outside plastic sheath AH. In this way, the residual length of the outside lead sheath AH projecting from the outside cladding AM of the cable CA forms a type of connector section that simplifies the later, mechanical longitudinal coupling and fastening of the light waveguide plug ST1 to the light waveguide cable CA.

The outside plastic sheath of the optical lead CBA is preferably removed over an end length of between 4 and 5 mm, particularly, between 2 and 3 mm. The plastic outside sheath AH of the optical lead CBA projects from the outside cladding AM of the optical cable CA over a residual length of preferably between 2 and 3 mm, particularly 0 and 2 mm.

A single light or optical waveguide CLW that is arranged approximately in the center of the light waveguide cable CA along its central axis ZA is uncovered by removing the outside lead sheath AH. The outside lead sheath AH is firmly seated on the outer plastic coating CCO of this light waveguide CLW. After it is removed, the light waveguide CLW is uncovered over a length of, preferably, between 35 and 40 mm, particularly between 5 and 10 mm. The light waveguide CLW is preferably released from the cable claddings AH, AM over such a great length that this uncovered light waveguide section can be placed into the receptacles or manipulators of a light waveguide welding apparatus of a known type.

This light waveguide CLW that has been made freely accessible is finely brought to a prescribable end length by cutting at the end or, respectively, face end with the light waveguide CLW projecting freely toward the outside from the lead sheath AH over this length. Subsequently, the waveguide CLW is freed of its outer plastic coating CCO, particularly its primary and secondary coating, over a prescribable end section proceeding from the end face, so that its optical fiber CFI lies bare. This method step is preferably followed by an end-face preparation of the optical fiber CFI with an approximately 90° breakage surface with reference to the longitudinal fiber axis.

The removal of the fiber coating expediently ensues such that the light waveguide CLW remains coated with the fiber coating along a residual length in the region of the breakage or cut edge of the outside lead sheath AH. The optical fiber CFI projecting from the lead sheath AH preferably exhibits a remaining, coated longitudinal section between 2 and 5 mm, particularly between 1 and 5 mm, as viewed from the breakage or cut edge of the lead sheath AH to the end face of the fiber.

The left half of the illustration of FIG. 1 shows an optical plug or, respectively. light waveguide ST1 that is allocated to the light waveguide cable CA for end-face connection. At its end face, i.e. in the left half of the illustration in FIG. 1, the light waveguide ST1 comprises a plug head SK1 of a known type that, for example, allows a corresponding light waveguide jack (of a known type) to be plugged in as a counter piece to the plug SKI. At the cable connection side, the optical plug ST1 exhibits an approximately circular-cylindrical crimp shoulder CRA. An approximately circular-cylindrical plug shoulder or, respectively, plug shank SAN is attached after the cable connection side, this shank exhibits a reduced outside diameter compared to the crimp shoulder CRA. A sub-section of a connecting light waveguide ALW hangs out of this plug shank SAN. This connecting light waveguide ALW preferably has its output side ending at the end face of the plug head SK1 at the side of the jack connection. It is preferably firmly embedded in the plug ST1, whereby it extends largely on a straight line along the central axis ZA thereof. It can particularly be expedient to already pre-fabricate the plug ST1 with the connecting light waveguide ALW at the factory. The equipping of the plug ST1 with the connecting light waveguide ALW can thus ensue under factory conditions, this assuring a high manufacturing quality. In particular it is largely assured that the optical fiber of the connecting light waveguide ALW can be accommodated essentially centrally in the plug head SK1 as well as without damage. Due to the prefabrication of the plug with a connecting light waveguide at the factory, thus, it is not necessary to thread the uncovered optical fiber CFI of the light waveguide cable CA to be equipped into the plug ST1, particularly into the plug housing thereof proceeding from the shank end SAN. This simplifies assembly to a rather substantial extent in a field employment. In particular, damage to the sensitive optical fibers is thereby largely avoided. Standard plugs from the standard series of the IEC-874-XXX family can preferably be employed, these being respectively pre-fabricatable with a light waveguide.

The light waveguide ALW preferably extends from the plug shank to such a great length that it can be placed into the receptacles or manipulators of a light waveguide welding apparatus of a known type. The connecting light waveguide preferably hangs from the shank end SAN of such a prefabricated plug over a sub-length between 5 and 60 mm, particularly between 10 and 15 mm.

The connecting light waveguide ALW extending out of the plug ST1 is expediently prepared corresponding to the light waveguide CLW of the light waveguide cable CA to be connected. In detail, this means that the connecting light waveguide ALW is freed of its outer plastic coating ACO, particularly of its primary and secondary coating, along a subsection proceeding inward from the face cut or end. The remainder of the coating is thereby left on the connecting light waveguide ALW over a remaining length. The optical fiber AF1 of the connecting light waveguide ACO thus lies bare along a prescribable end length. This optical fiber AFI is expediently brought to a prescribable ultimate length by cutting off a corresponding end section. Expediently, an approximately 90° end face is prepared and corresponds to the end face of the optical fiber CFI of the cable CA.

It can be particularly expedient to already separate the optical fiber AFI from the coating material of the connecting light waveguide ALW at the factory side or to already prefabricate the plug with a bare optical fiber from the very outset. The assembler thus has an optical plug available to him in field employment having an optical fiber that has been ready for connection, particularly ready for splicing. Such a prepared plug, which is already ready for splicing, is preferably made available to the respective assembler in a package that correspondingly protects the exposed connecting optical fiber AFI against mechanical stresses.

The optical fiber AFI of the connecting light waveguide ALW preferably lies free over a sub-length between 10 and 20 mm, particularly between 5 and 10 mm.

The plug ST1 with the optical fiber AFI extending out at the back, i.e. at the input side, as well as the cable end CA with the optical fiber CFI separated at the end are subsequently placed into a light waveguide splicing apparatus of a known type and are spliced to one another therein. For receiving and/or clamping the plug ST1 as well as the cable end CA fast, corresponding receptacles or manipulators can be provided in such a light waveguide splicing apparatus. For the sake of graphic simplicity, such holding devices for the plug ST1 as well as for the cable end CA have been omitted from FIG. 1. The connecting optical fiber ALW of the plug ST1 as well as the optical fiber CFI of the cable CA are brought into contact with one another at their end faces in such a light waveguide splicing apparatus and are fusion-welded to one another at their end faces with the assistance of electrodes EL1 and EL2. The finished splice location between the connecting optical fiber AFI and the optical fiber CFI is referenced SS in FIG. 1 and is also symbolically indicated by a transverse stroke.

Expressed in general terms, thus, a connecting light waveguide hangs or extends out of the optical plug to such an extent that it can be spliced at the end, which is outside the plug, to the light waveguide of the light waveguide cable to be connected upon formation of a splice SS. This rather substantially facilitates the implementation of the splicing process, particularly fusion welding process, since, of course, both the connecting optical fiber of the plug as well as the optical fiber to be spliced on from the cable CA to be fabricated at the end face lie freely accessible for the assembler without any housing parts of the plug whatsoever being in the way.

Before the two optical fibers AFI, CFI are welded, these are expediently aligned largely in alignment with one another and largely on a straight line as well as along the imaginary connecting line ZA indicated as a dot-dashed line. After implementation of the welding process and completion of the splice SS, the optical fibers AFI, CFI, which are exposed and bare, are again expediently coated on all sides with a plastic coat. In a schematic illustration, FIG. 2 shows a re-coating means RE1 in its open condition that serves this purpose. It is preferably a component part of a light waveguide welding apparatus. It comprises two formed parts FK1, FK2 into which filling channels HK1, HK2 are respectively formed in a longitudinal direction parallel to the alignment line ZA. The respective filling channel HK1 or, respectively, HK2 comprises an essentially semicircular inside contour viewed in cross-section, i.e., viewed spatially, it extends as a semicircular-cylindrical longitudinal channel parallel to the longitudinal extent of the two optical fibers AFI, CFI, which are welded to one another. The two formed parts FK1, FK2 have their longitudinal channels HK1, HK2 respectively allocated to one-half of the outside circumference of the optical fibers AF1, CFI. The parts can be displaced transversely relative to one another, particularly perpendicular to the longitudinal extent of the two optical fibers AFI, CFI, i.e. can move toward or away from the stationarily arranged optical fibers, namely preferably in a radial direction with reference to the central axis ZA. The closing and opening of the two formed parts FK1, FK2 can be preferably implemented with the assistance of at least one manipulator of a known type, as is standard in light waveguide splicing apparatus. FIG. 2 schematically indicates such a manipulator MP is dot-dashed lines and the manipulator MP acts transversely on the two formed parts FK1, FK2, particularly in a direction BP which is orthogonally relative to the central axis ZA.

When the two formed parts FK1, FK2 are pressed flush against one another, i.e. close, then they form a circular-cylindrical filling channel around the two light waveguides AFI, CFI, which are welded to one another and which are essentially centrally arranged in the channel. FIG. 3 schematically illustrates this in cross-section in the region of the splice SS. The inside diameter of this circular-cylindrical filling channel HK1, HK2 is selected larger than the outside diameter of the optical fibers AFI, CFI, so that the optical fibers are surrounded on all sides by a circular annular gap RS between their outside surfaces and the inside wall of the filling channels HK1, HK2. This annular gap RS is filled with a fluid coating material or with a soft coating compound RCM, so that the two optical fibers AFI, CFI can again be enveloped with a plastic coating all around their outside circumference. In FIG. 2, the fluid coating material RCM is supplied via a transverse channel EFK in the second formed part FK2, being supplied on the outside toward the inside to the circular-cylindrical filling channel, which is formed by the two semicircular-cylindrical filling channel HK1, HK2 of the formed parts FK1, FK2, which channels are shaped like a half shell. The delivery channel EFK thereby extends essentially in a radial direction with reference to the longitudinal extent of the two optical fibers AFI, CFI. The re-coating material RCM is preferably injected in fluid form into the circular-cylindrical formed channel of the re-coating means RE1 via the delivery channel EFK. A plastic, which is particularly resin, that exhibits approximately the same material properties as the original coating material of the optical fibers, is preferably employed as the re-coating material. This re-coating material can preferable be cured. In particular, the coating compounds of Desoto 235-200, Desolite 219 440 (registered trademarks) of the Desoto Company have been tested successfully.

Flint glass or silica glass, i.e. an optically transparent material expressed in general terms, is preferably employed for the first formed part FK1 in the re-coating means RE1 of FIG. 2. The coating material RC1 introduced as a fluid can thereby be cured by irradiation, for example with an arc discharge lamp or UV lamp LBL, so that the material RC1 is seated all around the glass material of the optical fibers AF1, CFI as rigid layer. A metallic material, particularly steel, is preferably employed for the second formed part FK2 lying opposite the first formed FK1. At the inside of the channel HK2, which faces toward the bare optical fibers AFI, CFI, this second formed part FK2 preferably comprises a mirrored inside surface. As a result thereof, the light penetrating through the first, transparent formed part FK1 is distributed largely uniformly all around the filling channel of the re-coating means RE1 or, respectively, is dispersed. In this way, a reliable and fast curing of the re-coating material RCM on all sides of the optical fibers CFI, AFI becomes possible. The inside diameter of the filling channel that is formed between the two formed parts FK1, FK2 lying on one another is expediently selected larger than the outside diameter of the optical fibers so that a desired radial coating thickness of the re-coating material RCM is achieved. The inside diameter of the circular-cylindrical filling channel between the two formed parts FK1, FK2 pressed flush against one another is expediently selected between 248 and 900 $\mu$m, and particularly between 248 and 250 $\mu$m. When employing monomode fibers whose outside diameters (without fiber coating) respectively preferably lie at approximately 125 $\mu$m, the cladding layer with the re-coating material RCM then preferably comprises a radial thickness between 60 and 325 $\mu$m, particularly between 61.5 and 62.5 $\mu$m.

The two formed parts FK1, FK2 of the re-coating means RE1 are least allocated to the two stripped longitudinal sections of the light waveguides ALW, CLW aligned with one another. In FIG. 2, the re-coating means RE1 exhibits such a longitudinal extent that it extends up to the crimp shoulder CRA of the plug ST1 at the plug connector side and terminates flush thereat with the breakage edge of the crimp shoulder CRA. At the cable connection side, it proceeds up to the breakage edge of the outside cable cladding AM and likewise terminates flush thereat with the breakage edge thereof. At the plug connector side, the two formed parts FK1, FK2 respectively comprise an approximately half shell-shaped, particularly semicircular-cylindrical recess SAB. Their inside radius is preferably selected such that the two formed parts FK1, FK2 embrace the plug shoulder SAN positively and/or non-positively after they are combined, i.e. are seated firmly thereon. The two joined formed parts FK1, FK2 thus comprise an approximately circular-cylindrical recess SAB at the plug connector side whose inside diameter essentially corresponds to the outside diameter of the circular-cylindrical plug connection SAN. Correspondingly thereto, the two formed parts FK1, FK2 are also provided with approximately semicircular-cylindrical recesses at the cable connection side. Their inside diameter is expediently selected such that the formed parts FK1, FK2—after they are joined clamp fast the lead sheath AH of the optical lead CBA, which is free of the cable cladding AM. In this way, a tight termination of the re-coating means RE1 is achieved both at the plug connection side as well as at the cable connection side, so that an emergence of the re-coating material RCM, which is filled in a liquid form, is largely avoided. The re-coating means RE1 thus terminates with a form-fit with the plug shoulder SAN and the lead sheath AH, as a result whereof the re-coating means RE1 is sealed against emergence of the re-coating material. The two formed parts FK1, FK2 in their joined condition preferably respectively form a circular-cylindrical tube section at the input as well as output side having an inside diameter of approximately 900 $\mu$m that approximately corresponds to the outside diameter of the optical lead CBA.

In this way, the splice location SS as well as the bare optical fiber sections AFI CFI can be re-coated. In particular, the coating residue ACO of the connecting optical fiber AFI can be materially joined to the coating residue CCO of the cable optical fiber CFI with the re-coating material RCM. The two optical fibers AFI, CFI are thereby coated with the re-coating material on all sides. An access or diffusion of moisture or water vapor into the glass material of the two optical fibers AFI, CFI is thus largely avoided.

Figure 4:
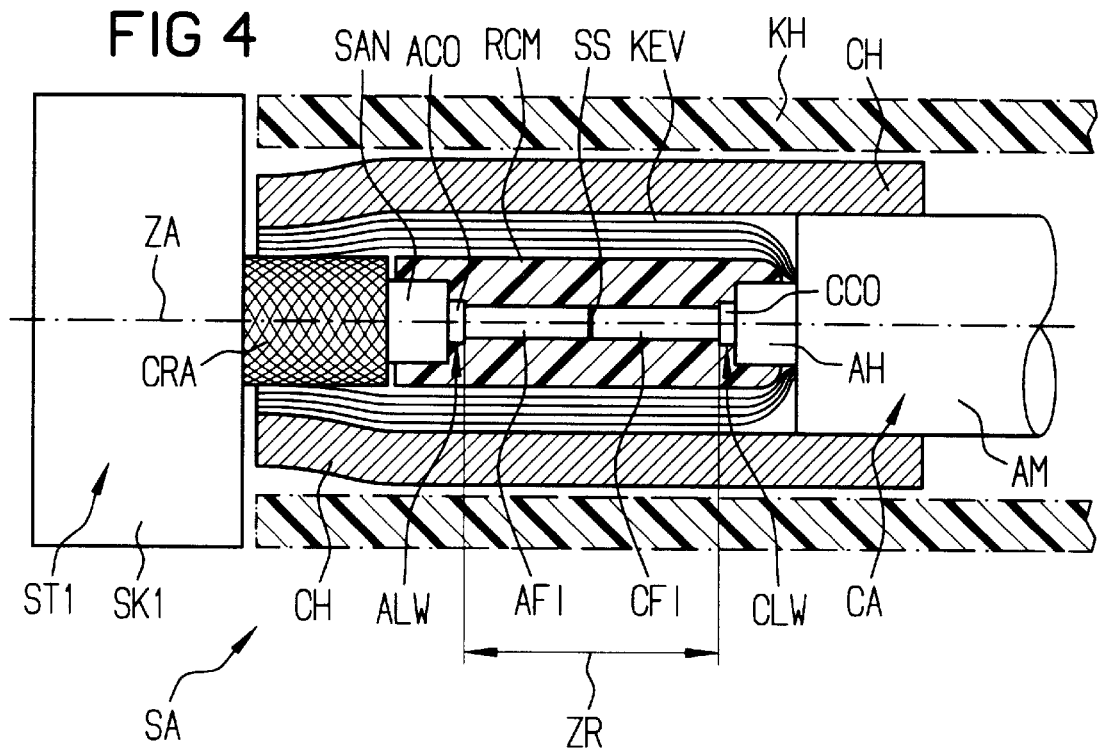
FIG. 4 is a schematic, longitudinal sectional view of the finished plug connection for the light waveguide cable of FIG. 1 after the implementation of the inventive method.

In a schematic longitudinal sectional view, FIG. 4 shows the finished plug connector SA for the light waveguide cable CA. The cured re-coating material RCM is seated on the two optical fibers AFI, CFI, which are welded to one another firmly block-like as in an approximately circular-cylindrical plastic sheath. The sheath extends at least over the longitudinal course ZR of the optical fibers AFI, CFI, which were exposed for the welding process. When the inside diameter of the recess of the joined formed parts FK1, FK2 of FIG. 2 at the input and/or output side is, in particular, somewhat larger then the respective outside diameter of the plug shoulder SAN and/or of the optical lead CBA, then these can be respectively integrated as well into the coating material. In FIG. 4, thus, a periphery of the plug shoulder SAN is also cast or surrounded by a flange-like portion of the cured re-coating material RCM at the plug connector side. In FIG. 4, the re-coating material RCM is also seated firmly at the cable connector side on the outside or periphery of the lead sheath AH projecting shank-like from the cable CA. As a result of the fact that both the plug shank SAN as well as the optical lead section projecting from the cable CA were co-cast with the coating material RCM, a material, continuous longitudinal connection is produced between the plug shank SAN and the optical lead CBA.

The outside diameter of the plug shoulder SAN is preferably selected approximately the same as the outside diameter of the outside lead sheath AH of the optical lead CBA. As a result thereof, the coating material RCM can be cast in the interspace between the crimp sleeve CRA and the outside cable cladding AM in the fiber longitudinal direction with a largely constant outside diameter. The cast section of the coating material thus exhibits an outside diameter that approximately corresponds to the outside diameter of the optical lead CBA.

The hardened re-coating material RCM comprises a radial layer thickness (with reference to the central plug axis ZA entered dot-dashed) preferably between 250 and 90 $\mu$m, particularly between 250 and 500 $\mu$m, in the region of the bare optical fibers AFI, CFI.

After the re-coating of the welded-together optical fibers AFI, CFI and the subsequent curing of this coating material RCM, the strain relief elements KEV are conducted over the splice location SS to the plug ST1 and coupled thereto such that a strain relief in the longitudinal cable direction is offered for the splice location SS and/or the plug ST1. The strain relief elements KEV are, in particular, placed essentially parallel to the central axis ZA from the breakage edge of the outside cable cladding AM up to the breakage edge of the plug head SK1. The strain relief elements KEV are expediently placed all around the outside circumference of the crimp shoulder CRA on the outside surface thereof. The strain relief elements KEV are thereby preferably distributed uniformly around the outside circumference of the cured cast section of the re-coating material RCM. To that end, they are already cut to a suitable final length in the cable preparation or only at this point. Their final length is expediently selected such that they extend from the breakage edge of the outside cable cladding AM up to the crimp shoulder CRA when they are stretched on a straight line. In this way, the strain relief elements KEV form an outside sheath of a type that is also originally available in the inside of the cable cladding AM.

After the strain relief elements are conducted continuously over the splice location SS from the light waveguide cable CA up to the crimp shoulder CRA and are in place on the shoulder CRA, the crimp sleeve CH, which was slipped on in the preparation of the cable CA, is pushed forward up to the plug head SK1 and pressed on the crimp shoulder CRA. As a result thereof, the strain relief elements are firmly held on the crimp shoulder CRA and a strain relief across the splice location SS is thus offered for the plug ST1. In this way, a tensile coupling of the plug ST1 to the light waveguide cable CA is enabled. This largely prevents inadmissibly high tensile forces from acting on the splice location SS. The splice location SS thus remains largely free of inadmissibly high tensile forces that could potentially occur given use of the light waveguide cable CA fabricated with the plug at its end side. After the crimp sleeve CH is slipped over the splice region, it preferably extends from the end face of the plug head SK1 at the cable connection side, i.e. from the crimp shoulder CRA, across the splice region at least up to the breakage edge of the cable cladding AM of the light waveguide cable CA at the plug connection side. As a result thereof, the crimp sleeve offers an additional mechanical relief in the longitudinal cable direction. At the same time, the crimp sleeve CH makes the plug connection largely mechanically stable, so that pinchings or crushings of the internally disposed, sensitive optical fibers AF1, CF1 are largely avoided, particularly at their splice location SS. As warranted, it can also be expedient to select the crimp sleeve CH so long that it also covers a sub-length of the outside cladding AM. The crimp sleeve CH is then additionally expediently firmly pressed on the outside cladding AM of the light waveguide cable CA. A metallic material, particularly aluminum, can preferably be selected for the crimp sleeve CH.

The strain relief elements KEV and the crimp sleeve CH slipped on at the outside and respectively fixed at their end sides largely assure, in particular, that the optical fibers remain largely stress-free in the inside, even when the cable CA and/or the plug ST1 is pulled in the longitudinal cable direction. In that the strain relief elements KEV of the cable CA itself are employed and placed over the splice location SS up to the plug, an adequate strain relief for the plug as well as for the splice location is already offered merely by these strain relief elements that are already present without requiring additional strain relief elements. Tensile forces that potentially take effect at the plug can thus be forwarded onto the light waveguide cable CA via the strain relief elements KEV.

After the application of the crimp sleeve CH, finally, the anti-buckling sheath or, respectively, socket KH is also pulled on at the outside, and this sleeve, of course, was pushed over the outside cladding AM of the light waveguide cable CA during the preparation of said light waveguide cable CA. An elastic, flexible plastic material such as, for example, PVC (polyvinyl chloride) is preferably selected for the anti-buckling socket KH. It can preferably be coated on the inside with an adhesive or melt adhesive, so that it remains adhering to the crimp sleeve CH. The anti-buckling socket KH is preferably pulled forward up to the breakage edge of the plug head SK1, so that it terminates flush thereat. The anti-buckling sheath preferably extends at least from the end face of the plug head SK1 at the cable connection side up to the breakage edge of the outside cable cladding AM at the plug connection side. In particular, it extends over the longitudinal sections of the spliced-together optical fibers AF1, CF1. It is preferably at least as long as the crimp sleeve.

A multi-layer splice protection sheath or, respectively, covering is thus ultimately formed in the shank region of the plug ST1 firmly mounted on the light waveguide cable CA. The layer thickness of the re-coating RCM, strain relief element sheath, crimp sleeve as well as anti-buckling sheath seated on the top (enumerated in the sequence as viewed from inside toward outside) is respectively preferably selected so that the overall outside diameter of the multi-ply splice location envelope approximately correspondence to the original outside diameter of the light waveguide cable CA.

FIG. 5 shows an optical plug ST2 modified compared to FIGS. 1 through 4 and a modified re-coating means RE2. The plug ST2 with a plug head SK2 is likewise prefabricated with a light waveguide such as, for example, ALW that extends out of a plug shank SAN2 at the end along a prescribable end length. A ferrule FER is inserted in the plug head SK2 at the side opposite the cable CA to be connected and is preferably glued in position. An optical fiber of the connecting light waveguide ALW is largely centrally embedded in the ferrule FER and is ready for connection. Differing from FIGS. 1 through 4, the plug shank SAN2 comprises an inside bore EK having such a large inside diameter that the re-coating means can be introduced or plugged into the plug shank. To this end, the re-coating means RE2 comprises two connecting flanges IST1, IST2 at the plug connector side whose outside diameter in the assembled condition of the two formed members FK1, FK2 is smaller than the inside diameter of the through bore EK in the plug shank SAN2. This makes it possible to also fill the plug shank SAN2 with the re-coating material RCM using the re-coating means RE2.

In a schematic longitudinal illustration, FIG. 6 shows the optical plug of FIG. 5 together with a further, modified re-coating means RE3. The two formed parts FK1, FK2 of the re-coating means RE3 now comprise two connecting flanges AST1, AST2 at the plug connection side that can be slipped onto the outside of the plug shank SAN2. In the assembled condition of the re-coating means RE3, there are two shank-like connecting flanges AST1, AST2 enclose a circular-cylindrical recess having a larger inside diameter then the outside diameter of the plug shank SAN2. As a result thereof, the re-coating means RE3 can be slipped over the plug shoulder SAN2. In particular, it can be plugged onto the plug shoulder SAN2. As a result thereof, it is possible to again surround the two optical fibers CFI, AFI (see FIG. 1) with coating material without filling the plug with coating material.

It can also be potentially expedient to already embed the connecting light waveguide ALW in the through bore EK of the plug shoulder or, respectively, plug shank SAN2 in filling material at the factory or to firmly cast it into plastic material thereat. In FIG. 6, the connecting light waveguide ALW is firmly cast into coating material COM in the plug shoulder SAN2.

Of course, the plug conforming to the inventive principle can also be mounted on a light waveguide of a light waveguide cable that does not comprise only a single light waveguide in the inside (like the cable CA in FIGS. 1 through 6) but has a plurality of light waveguides, i.e. several light waveguides. The plug can also be mounted on a simple optical fixed lead, i.e. the outside plastic cladding AM and/or the sheath of strain relief elements KEV given the light waveguide cable CA of FIG. 1 would thereby be omitted. Within the scope of the invention, the term light waveguide cable also at least includes a light waveguide along which at least one strain relief element is conducted. The strain relief element can thereby also already be formed by a tensile plastic sheath that is seated on the light waveguide to be connected or can be formed by some other tensile covering element such as, for example, a tear thread in the light waveguide cable structure.

In addition, it can also be potentially expedient to connect the optical fiber (such as, for example, CFI) separated from the cable (such as, for example, CA) to the connecting optical fiber (such as, for example, AFI) of the plug (such as, for example, STI) not with fusion welding but with a sleeve, adhesive or in some other way.

A development of the invention is based, in particular, on the object of disclosing another way by which a light waveguide plug can be dependably attached to a light waveguide cable with simple assembly steps. This object is advantageously achieved in that the connecting light waveguide hangs or extends out of the plug with such a length that the waveguide together with its plug can be placed into at least one receptacle device of a light waveguide splicing apparatus.

As a result thereof, the simple as well as dependable allocation of a light waveguide cable with a plug is advantageously enabled.

A development of the invention is also directed to a plug connector for a light waveguide of a light waveguide cable upon employment of a plug that comprises a connecting light waveguide, whereby the connecting light waveguide hangs or extends out of the plug to such an extent that it can be spliced at its end outside the plug to the light waveguide of a light waveguide cable upon formation of a splice location, and whereby at least one strain relief element of the light waveguide cable can be conducted across the splice location to the plug and can be coupled thereto so that a strain relief is offered for the splice location. This is characterized in that the connecting light waveguide hangs or extends out of the plug with such a length that the waveguide together with its plug can be placed in at least one receptacle means of a light waveguide splicing apparatus.

A development of the invention is also directed to a method for producing a plug connection for a light waveguide of a light waveguide cable upon employment of a plug that comprises a connecting light waveguide, whereby the light waveguide is separated at the end from the light waveguide cable with a prescribable longitudinal section, whereby this light waveguide as well as a connecting light waveguide extending out of the plug at the cable connection side are respectively decoated along a prescribable end section, so that their optical fibers lie free of coatings, whereby these two optical fibers are welded to one another at their end faces outside the plug upon formation of a splice location, and whereby at least one strain relief element of the light waveguide cable is conducted across the splice location to the plug and is coupled thereto so that a strain relief that bridges the splice location is offered for the plug in longitudinal direction. This is particularly characterized in that the connecting light waveguide of the plug is prepared in advance such that it extends out of the plug with such a great end length that the waveguide together with the plug can be placed into at least one receptacle device of a light waveguide splicing apparatus.

FIGS. 7 through 15 respectively schematically illustrate a time sequence of assembly steps with which a light waveguide plug can be advantageously attached to a light waveguide cable:

According to FIG. 7, an anti-buckling socket or, respectively, sheath KH is initially slipped over the free end EN of a light waveguide cable CA in a first assembly step. The sheath KH is pushed so far away from the free end EN over the outside cladding AM along the central axis or, respectively, longitudinal extent ZA that a prescribable end section CL1 of the light waveguide cable CA projects from the anti-buckling socket KH. The light waveguide cable CA preferably extends or hangs out of the anti-buckling socket KH over an end length CL1 of at least 30 mm, particularly between 50 and 100 mm, and preferably about 70 mm.

The anti-buckling sheath KH is preferably formed by a plastic sheath. A soft, flexible plastic material such as, for example, polyethylene is expediently selected for this sheath KH. The anti-buckling sheath KH preferably comprises such a longitudinal extent that the overall length of the opened-up, freely accessible splicing region between the light waveguide cable CA and a light waveguide plug to be connected at the end (such as, for example ST2 of FIG. 10) can be covered from the outside with the assistance of the sheath KH after forming a connection to a light waveguide plug. A longitudinal extent of at least 100 mm, particularly between 100 and 200 mm, preferably of about 120 mm, is preferably selected for the anti-buckling sheath KH.

In a next assembly step, the outside cladding AM of the light waveguide cable CA is taken off, i.e. removed, along a sub-length CL2 of this end section CL1 thereof that hangs out. The removal of the light waveguide outside sheath AM is indicated in FIG. 7 in that the outside cladding AM is shown merely dot-dashed along the longitudinal section CL2. The outside cable cladding AM can be fashioned as a single-layer or a multi-layer. Polyethylene, for example, is preferably employed for it as material.

An optical lead CBA appears under the outside cable cladding AM. The optical lead CBA is released from the outside cladding AM along an end length of, preferably, at least 50 mm, and particularly between 50 and 100 mm, preferably of about 65 mm.

By removing the outside cable cladding AM, a plurality of strain relief elements KEV is uncovered directly therebelow, which elements cover the outside plastic sheath of the individual optical leads CBA. The strain relief elements KEV can be applied as a single-layer or a multi-layer on the approximately circular-cylindrical optical lead CBA in the form of a sheath. They preferably proceed along the longitudinal extent of the optical leads CBA, particularly parallel to their central axis ZA. Reinforcing fibers, particularly saturated glass fibers or aramide yarns, are preferably provided as the strain relief elements KEV in the optical cable CA. The strain relief elements KEV uncovered along the predetermined stripping length are expediently bent back from the cable end EN in the opposite longitudinal direction of the cable CA onto the outside cladding AM. In particular, the elements KEV are bent back by approximately 180° from their parallel course (with reference to the central cable axis ZA) immediately upon emergence from the outside plastic cladding AM at the breakage edge thereof to the uncovered optical leads CBA. The bent-back strain relief elements KEV are expediently laterally limited during the end preparation of the light waveguide cable CA and are fixed to either the outside cable cladding AM or the sheath KH during the splicing thereof to the light waveguide plug ST2 (see FIG. 11). To that end, the strain relief elements KEV can, for example, be inserted into the anti-buckling socket or sheath KH, which is inserted over the outside cable cladding AM or, respectively, can be plugged thereinto and clamped fast at the outside cable cladding AM as a result thereof.

In a next preparation step (see FIG. 8), the outside plastic sheath AH of the uncovered optical lead CBA is removed along a prescribable end length CL2* proceeding from the face end EN thereof. A plastic is preferably employed for the outside plastic sheath AH of the optical lead CBA. In particular, a resin is suitable as material for the outside plastic sheath AH.

The outside plastic sheath AH of the optical lead CBA is preferably removed along an end length CL2* of at least 20 mm, particularly between 20 and 50 mm, and preferably about 35 mm.

Due to the removal of the outside lead sheath AH, an individual light waveguide CLW is uncovered that is essentially arranged along the central axis ZA of the light waveguide cable CA. The outside lead sheath AH is firmly seated all around on the outside plastic coating CCO of this light waveguide CLW. The light waveguide CLW is preferably released from the cable envelopes AM, AH over such a great length that this uncovered light waveguide section CL2* can be inserted into the receptacles or manipulators of a light waveguide welding apparatus of a known type (see FIG. 11). After the removal of the cable envelopes AM, AH, the light waveguide CLW is preferably uncovered over a length CL2* of at least 20 mm, particularly between 20 and 50 mm, and preferably about 35 mm (calculated from the cable end EN).

As next preparation measure (see FIG. 9), the light waveguide CLW is freed of its outer plastic coating CCO, particularly its primary and secondary coating, i.e. is de-coated, along a prescribable sub-length proceeding from the end face or end EN. In this way, its optical fiber CFI lies bare, i.e. free, along a prescribable end section CL3. The optical fiber CFI projecting from the lead sheath AH preferably exhibits at least a length CL3 of 5 mm, particularly between 10 and 100 mm, and preferably about 10 mm, as seen from the breakage or cut edge of the coating CCO up to the fiber end face EN.

It can potentially be expedient to prepare the optical fiber CF1 at its end face in addition thereto. Particularly by parting or cutting an end section of the bare optical fiber at an approximately 90° angle, a cleavage face can be advantageously offered at the end face of the optical fiber with reference to the longitudinal axis thereof. It can also be potentially expedient to polish the fiber end face in order to eliminate potential burrs or other irregularities. In this way, a largely smooth, 90° end face can be offered for the optical fiber CFI.

The plastic coating CCO of the light waveguide CLW is expediently removed only along an end sub-section CL3 of the overall longitudinal length CL2*. As a result thereof, the light waveguide CLW can be grasped by one or more receptacle, particularly clamped devices of a light waveguide splicing apparatus in the region of the plastic coating CCO. Damage to the sensitive optical fiber CFI is thus largely prevented by the plastic coating.

The preparation step for uncovering the light waveguide CLW potentially also includes that the uncovered light waveguide CLW is cut, i.e. shortened, to the desired end length CL2*. Corresponding thereto, the uncovered optical fiber CFI is expediently shortened to the desired end length CL3 after the stripping of the light waveguide coating CCO.

Figure 10:
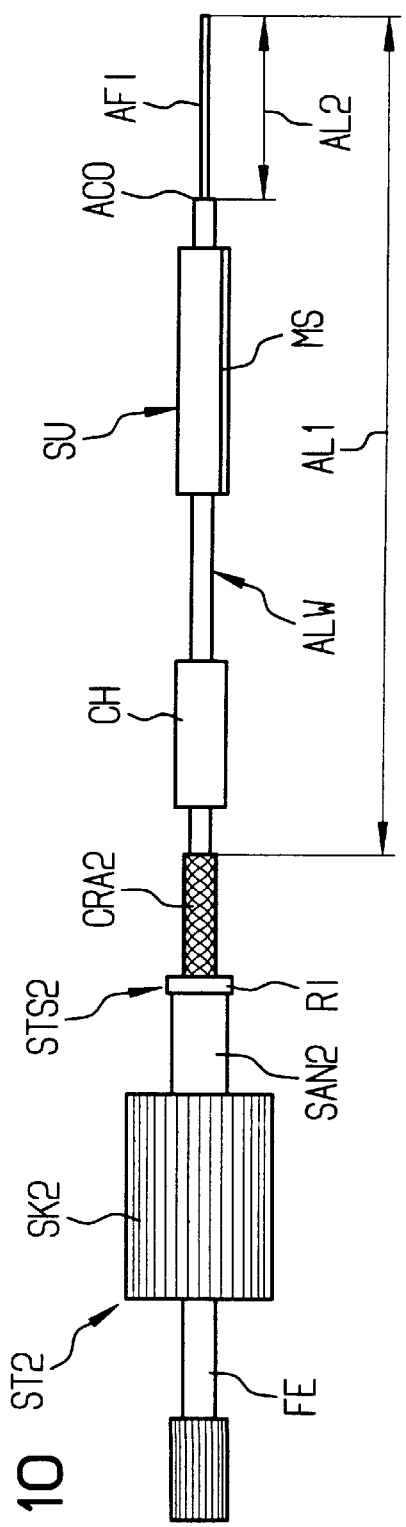
FIG. 10 is a schematic side view of a further light waveguide plug with a connecting light waveguide extending out from an end and being prepared for connection to the prepared light waveguide cable of FIG. 9.

In a schematic illustration, FIG. 10 shows the light waveguide plug ST2 that is prepared or prefabricated with a connecting light waveguide ALW. The light waveguide plug ST2 comprises a ferrule FE that extends from one end face at the side of a jack connection, for example from the left half of the illustration in FIG. 10. This ferrule FE is inserted into a preferably circular-cylindrical plug head SK2. The ferrule FE serves for the acceptance of an optical fiber section of the connecting light waveguide ALW. To that end, the ferrule FE comprises an inside bore along its central axis ZA in which the optical fiber of the connecting light waveguide ALW is securely seated and protected against mechanical stresses. The ferrule FE at the output-side end of the light waveguide plug ST2 allows the plug ST2 to be plugged into a corresponding light waveguide jack of a known type that is fashioned as counter-piece to the plug. Such a plug jack has not been shown in FIG. 10 for the sake of clarity.

A plug shank STS2 projects from the plug head SK2 at the cable connection side. The plug shank STS2 extends essentially in a straight line and is essentially directed in alignment onto the central axis of the ferrule FE. It is firmly attached to a connection piece SAN2 at the plug head SK2. It is fashioned as a crimp shoulder CRA2 in the region of the free end. Both a shaft connection piece SAN2 as well as the crimp shoulder CRA2 are respectively fashioned largely as a circular-cylindrical sleeve. The crimp should CRA2 thereby exhibits a smaller outside diameter than the connection piece SAN2. A locking ring RI proceeding around the outside circumference is firmly attached to the offset edge between the connection piece SAN2 and the crimp shoulder CRA2. This lock ring RI serves in an axial direction as an abutment for a crimp sleeve CH, which is to be applied later. The plug shank STS2 preferably extends over a length of at least 5 mm, particularly between 5 and 15 mm, and preferably about 8 mm.

The connecting light waveguide ALW is fixed in this plug shank STS2 and extends out of the plug shank STS2 over a prescribable end length AL1. The connecting light waveguide ALW preferably projects from the plug shank over such a great length that it can be placed into the receptacles or manipulators of a light waveguide splicing apparatus of a known type. The connecting light waveguide ALW preferably extends from the plug shank STS2 over a sub-length of at least 50 mm, particularly between 50 and 100 mm, and preferably about 65 mm.

Before the connecting light waveguide ALW is prepared at its end for connection to the light waveguide CLW of the light waveguide cable CA, a crimp sleeve CH is first expediently loosely placed over a free end, followed by a splice protection sleeve SU. The crimp sleeve CH is thereby seated on a coating ACO of the connecting light waveguide ALW (viewed in longitudinal direction thereof), expediently closer to the plug shank STS2 than the splice protection sleeve SU. A metallic material, particularly nickel-plated brass, is preferably employed for the crimp sleeve CH, which is preferably fashioned roughly as a circular-cylinder. A shrink hose is preferably provided as a splice protection sleeve SU. This shrink hose is preferably fashioned roughly as a circular-cylinder. A metal rod MS, in particular, is additionally integrated in the plastic material, this proceeding along the longitudinal extent of the connecting light waveguide ALW. This metal rod MS assumes the function of a tensile reinforcement in the plastic material of the splice protection sleeve SU. As warranted, it can also be expedient to embed one or more reinforcing fibers or some other tensile elements such as, for example, saturated glass yarns or aramide yarns into the plastic material of the splice protection sleeve SU in longitudinal direction of the connecting light waveguide ALW.

It can be especially expedient to already pre-fabricate the plug ST2 with the connecting light waveguide ALW at the factory. The equipping of the plug ST2 with the connecting light waveguide ALW can thus occur under factory conditions, which assures a high fabricate quality. In particular, it is largely assured that the optical fiber of the connecting light waveguide ALW can be accommodated essentially centrally as well as without damage in the plug head SK2 and in the ferrule FE thereof at the side of the jack connection. Given factory prefabrication of the plug ST2 with the connecting light waveguide ALW, it is thus not necessary in a field employment to thread the optical fiber of the connecting light waveguide AL2 into the plug ST2, particularly into its plug housing proceeding from the shank STS2. This is a major advantage over assembly in field employment because damage to the sensitive optical fiber of the connecting light waveguide is thereby largely avoided. Standard plugs from the standard series of the IEC-874-xxx can preferably be employed and these are respectively capable of being pre-fabricated with a light waveguide. Of course, it can also be potentially expedient to assemble the plug ST2 of its individual components only as needed and not already at the factory. In particular, the connecting light waveguide is then threaded into the plug shank STS2, the plug head SK2 and the ferrule FE during field employment and fixed thereat.

The connecting light waveguide ALW extending out of the plug ST2 is expediently prepared in advance according to the light waveguide CLW of the light waveguide cable CA to be connected. In detail, this means that the connecting light waveguide ALW is freed of its outer plastic coating ACO, particularly of its primary and secondary coating, over a sub-section AL2 proceeding from the free end face. The connecting light waveguide ALW is thus only decoated over a sub-length AL2 of the overall length AL1. The optical fiber AFI thus continues to be covered with a plastic coating from the end of the plug shank STS2 up to the breakage or cut edge of the light waveguide coating ACO. The optical fiber AFI of the connecting light waveguide AIW is preferably uncovered over an end length of at least 5 mm, particularly between 10 and 100 mm, and preferably about 10 mm. The optical fiber AFI of the connecting light waveguide ALW thus lies bare along a prescribable end length. This optical fiber AFI is expediently brought to a prescribable end length by cutting off a corresponding end section. Expediently, an approximately 90° end face with reference to the longitudinal fiber extent is prepared in advance for the fiber AF1 and corresponds to the end face of the optical fiber CFI of the light waveguide cable CA. It can be especially expedient to already separate the optical fiber AF1 from the coating material of the connecting light waveguide ALW at the factory. The assembler in the field employment then has an optical plug available to him having an optical fiber that has been made ready to connect, particularly ready to splice. Such a plug already prepared in a fashion ready to be spliced is preferably made available to the respective assembler in a package that correspondingly protects the uncovered connecting optical fiber AFI against mechanical stresses.

Of course, it can also be expedient to interchange the time sequence of the cable preparation and plug preparation, for example to first prepare the connecting light waveguide of the light waveguide plug and only then to separate the light waveguide of the light waveguide cable to be connected therefrom and to correspondingly prepare it. In a next assembly step, the uncovered optical fiber CFI of the light waveguide cable CA is now spliced at its end face to the end face of the exposed optical fiber AFI of the connecting light waveguide ALW, particularly by being thermally welded thereto.

Figure 11:
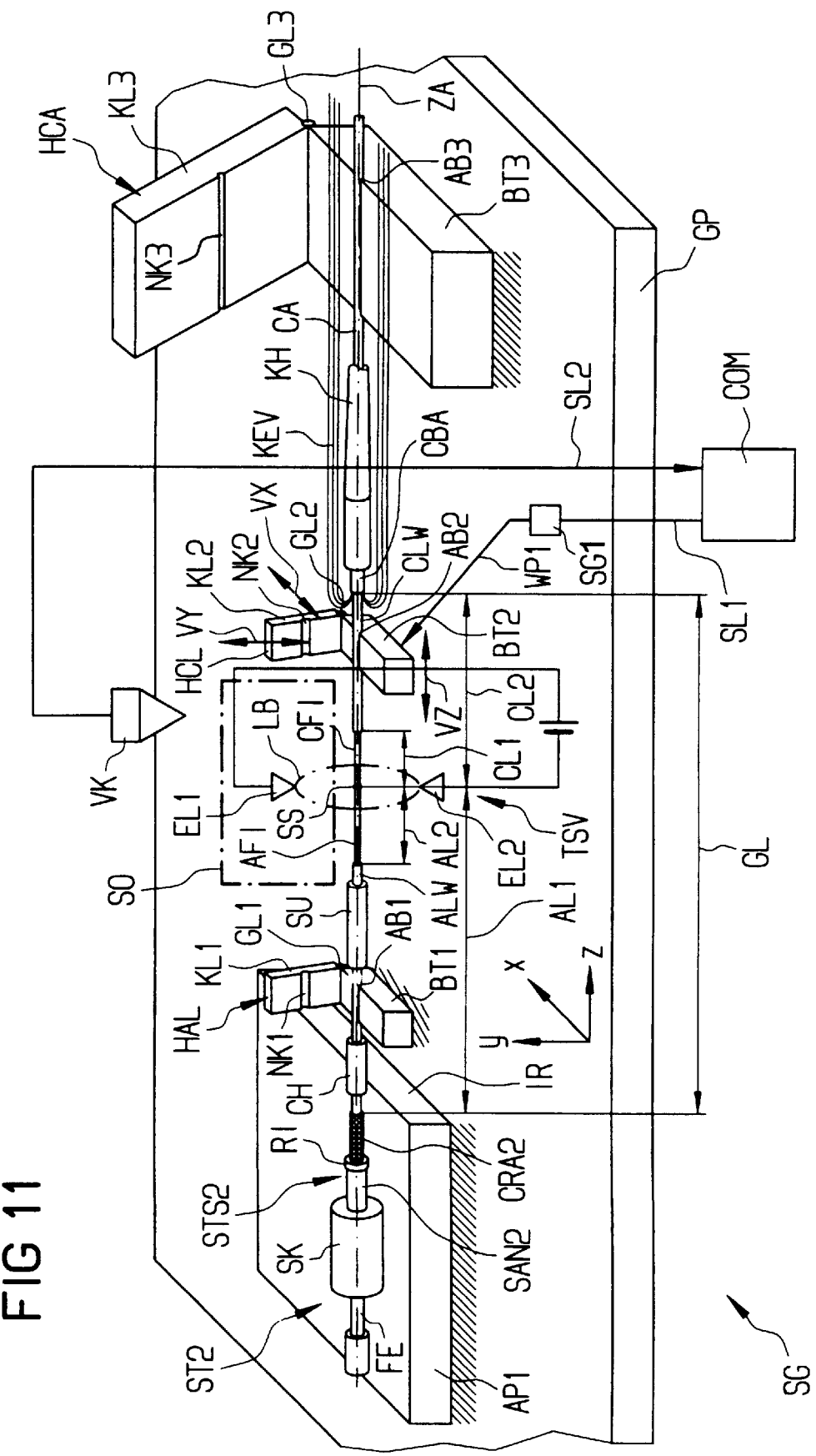
FIG. 11 is a schematic perspective view showing the basic structure of a light waveguide splicing apparatus in whose receptacle devices the light waveguide plug of FIG. 10 as well as the light waveguide cable of FIG. 9 are placed for being spliced to one another.

Schematically as well as partially in a perspective illustration, FIG. 11 shows the basic structure of a light waveguide splicing apparatus SG that is suitable for this purpose. The splicing apparatus is, in particular, fashioned as a thermal light waveguide welding apparatus. The light waveguide plug ST2 is deposited in the left half of the illustration of FIG. 11 on a table-like or plate-like plug deposit AP1 that is elevated over a work table or base plate GP of the splicing apparatus SG. This plug deposit API is rectangularly fashioned and is stationarily arranged on the preferably planar work table GP of the welding apparatus SG. The connecting light waveguide ALW extending out of the plug ST2 projects freely beyond the right-hand edge of the plug deposit AP1 in the direction toward the welding device TSV of the splicing apparatus SG. The waveguide ALW is preferably aligned largely on a straight line along its longitudinal extent and is inserted into an allocated receptacle or, respectively, holding mechanism or device HAL of a known type of the welding apparatus SG, which mechanism is potentially elevated relative to the work table GP. The connecting light waveguide ALW is retained and fixed in position with this holding device HAL. For better illustration of the fixing effect of the first holding device HAL, it is shown in an open condition by way of example in the left part of FIG. 11. The device HAL comprises a base part BT1, which has a longitudinal channel AB1 on an upper surface. The connecting light waveguide ALW is placed into this longitudinal channel AB1 at a longitudinal location of its still coated longitudinal section, i.e. a longitudinal section that is still plastic coated. A flap or cover KL1 that can be pivoted in the direction toward the base part BT1 is attached to the base part BT1 via an articulation GL1, hinge or the like. A longitudinal channel NK1 corresponding to the longitudinal channel AB1 in the base part BT1 is provided at the inside surface of the cover KL1. The longitudinal channels NK1, AB1 are respectively fashioned semicircular-cylindrically. In the closed condition of the holding device HAL, the two longitudinal channels NK1, HB1 form a longitudinal channel with a circular-cylindrical shape that is closed on all sides for the connecting light waveguide ALW. The inside diameter of this longitudinal channel is thereby preferably selected approximately the same as the outside diameter of the connecting light waveguide ALW. After closing the holding device HAL, thus, the connecting light waveguide ALW is clamped between the base bar BT1 and the cover or upper part KL1 and is retained therebetween.

In FIG. 11, the holding device HAL fixes the connecting light waveguide ALW along a sub-section, by way of example, in the gap between the local position of the slipped-on crimp sleeve CH and the splice protection sleeve SU. The connecting light waveguide ALW has its optical fiber AF1 exposed at its end projecting freely from the holding device HAL.

It can also be potentially expedient to fix the plug ST2 itself in position with a corresponding holding device of a known type, i.e. to retain it stationarily.

Figure 9:
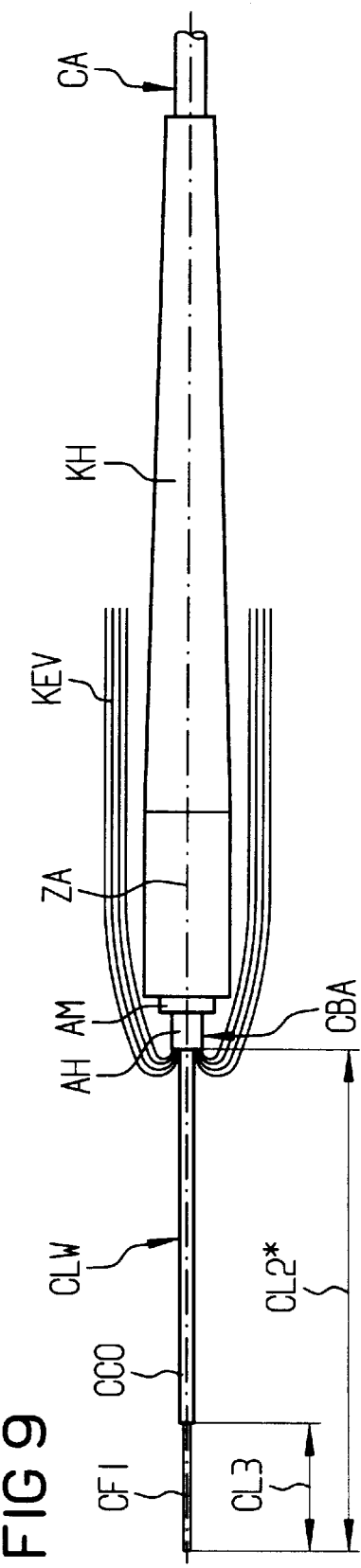

The prepared light waveguide cable CA of FIG. 9 is deposited in one or more allocated receptacles of a known type (such as, for example, manipulators) of the welding device SG at that side of the welding device SG that lies opposite the plug deposit, and the receptacles are likewise arranged elevated on the work table GP. In FIG. 11, the light waveguide cable CA is fixed in position or retained along a sub-section of its outside cladding with the assistance of a stationary holding mechanism HCA that is preferably fashioned analogous to the holding device HAL. FIG. 11 thereby shows the holding mechanism HCA in its opened condition as well and it comprises a base part BT3 whose longitudinal channel NK3 serves for the acceptance of the light waveguide cable CA. A cover KL3 can be hinged onto the base part BT3 via an articulation GL3. A longitudinal channel NK3 is formed in an inside surface of the cover KL3 and this corresponds to the topical position of the longitudinal channel AB3 in the base part BT3. As a result thereof, the cable CA can be clamped fast between the cover K13 and the base part BT3 when the holding mechanism HCA is closed. The holding mechanism HCA thus grasps the light waveguide cable CA at such a sub-section that faces away from the free end of the light waveguide cable and along which the light waveguide cable CA still exhibits its outside cable cladding. The laid-back strain relief elements KEV of the cable CA are preferably extremely placed into the holding mechanism HCA together with the cable CA and are clamped fast therein.

The light waveguide CLW released from the cable CA at the end is placed into a holding mechanism HCL in a way corresponding to the connecting light waveguide ALW and is clamped fast therein. The holding mechanism HCL is likewise preferably fashioned corresponding to the holding device HAL and it comprises a base part BT2 as well as a cover KL2 attached thereto via an articulation GL2. Longitudinal channels AB2 and NK2 are formed in the contacting surfaces of base part BT2 and cover KL2. In the closed condition of the holding mechanism HCL, the two longitudinal channels correspond with one an other and embrace the cable light waveguide CLW in the fashion of a half-shell. The light waveguide CLW projects from this holding mechanism HCL freely with its exposed optical fiber CFI. The cable CA as well as its separated light waveguide CLW are preferably positioned largely straight-line in the appertaining holding devices HCA, HCL.

The plug deposit API, the holding devices HAL, HCL as well as HCA are preferably arranged elevated on the common, preferably planar worktable GP. Thereby deriving along the longitudinal extent of the connecting light waveguide ALW and/or of the cable light waveguide CLW viewed from left to right are, in particular, the following sequence of the arrangement: the plug ST2 lies on the plug deposit AP1 with a sub-length of its projecting connecting light waveguide ALW. A sub-section of the connecting light waveguide ALW that projects beyond the inside front side IR of the elevated plug deposit AP1 (in the direction of the splice location SS) is fixed in position by the holding mechanism HAL. The crimp sleeve CH is thereby seated on the connecting light waveguide ALW in the gap between the inside front side IR of the plug deposit AP1 and the holding mechanism HAL, this crimp sleeve CH bridging the plug deposit AP1 up to the holding mechanism HAL. Sufficient space is thus left for the crimp sleeve CH, particularly lateral direction, particularly in a Y-direction as well as in longitudinal direction that it can be accepted in the gap thereat. In this way, the connecting light waveguide ALW can be laid largely on a straight line. The splice protection sleeve SU is slipped on over the end section of the connecting light waveguide ALW projecting freely from the holding mechanism HAL, and is slipped on at that side of the holding mechanism HAL facing toward the splice locations. The connecting light waveguide ALW projects therefrom with its exposed, bear optical fiber AFI. At the other, opposite side of the splicing location SS, the cable light waveguide CLW projects freely from the holding mechanism HCL in the direction of the splice location SS. The holding mechanism HCA for the light waveguide cable CA is positioned with a longitudinal spacing from the holding mechanism HCL in the direction of the cable end facing away from the splice location SS. The anti-buckling socket KH can then be arranged on the cable light waveguide CLW in this gap between the splice-proximate holding mechanism HCL and the holding mechanism HCA lying at the outside and without disturbing the straight-line course of the cable light waveguide CLW since, of course, it finds space in the gap, particularly in the Y-direction, i.e. toward the top and bottom.

In order to be able to align the two optical fibers CFI, AFI optimally aligned with one another, at least one of the holding devices such as, for example, HAl or HCL is fashioned displaceable in at least one spatial direction transversely or, respectively, laterally, particularly perpendicularly relative to the respective longitudinal fiber axis. In the present exemplary embodiment, the holding mechanism HAL is attached stationarily on the work table GP in all three spatial directions X, Y, Z, whereas the holding mechanism HCL for the cable light waveguide CLW is fashioned displaceable in at least one lateral direction with reference to the central axis ZA thereof. In particular, the holding mechanism HCL enables movements in all three spatial directions, namely X, Y, Z, of a Cartesian coordinate system. The spatial direction Z thereby indicates the longitudinal direction along which the two optical fibers AFI, CFI, which are to be spliced to one another, should be optimally aligned with one another. With the assistance of the holding mechanism HCL, the optical fiber CFI can be displaced in the Z-direction relative to the stationarily arranged optical fiber AFI. The holding mechanism HCL thus sees to it that the two optical fibers AFI, CFI can be moved toward one another or away from one another. In particular, the Z-direction corresponds to a desired alignment line along which the two optical fibers AFI, CFI should be directed optimally aligned with one another. The spatial direction X proceeds in a transverse direction relative to the longitudinal extent of the two light waveguides, ALW, CLW, particularly perpendicularly, i.e. orthogonally relative to the spatial direction Z. The planar work table GP thereby lies, in particular, parallel to the plane erected by the X-spatial direction and Z-spatial direction. The spatial direction Y resides perpendicular to this X, Z-plane, and it proceeds toward the top or bottom. The displacement of the holding mechanism HCL into the corresponding spatial direction X, Y, Z is indicated by motion arrows VX, VY or VZ.

The displacement of the holding mechanism HCL into the respective spatial direction X, Y or Z is undertaken in FIG. 11 with the assistance of an actuator SG1 that receives its control signals from an evaluation/control means COM via a control line SL1. The displacing effect of the actuator SG1 on its allocated holding mechanism HCL is schematically indicated in FIG. 11 with the assistance of an action arrow WP1.

In order to be able to acquire the respective, current positional offset of the two optical fibers AFI, CFI to be welded to one another transversely, particularly orthogonally relative to their longitudinal extent, i.e their momentary lateral aligned condition with respect to their longitudinal extent, an optical imaging system or, respectively, image processing system VK, particularly a video camera, is allocated to the welding region of the optical fiber ends CFI, AFI of FIG. 11 residing opposite one another. An image processing system as recited in detail in terms of function and action in U.S. Pat. No. 5,011,259 is particularly suited for this purpose. In FIG. 11, the optical imaging or, respectively, pick-up system VK has been merely schematically indicated above the base plate GP for graphic simplicity. It is connected via a test line SL2 to the evaluation/control means COM in order to be able to evaluate the image information it picks up. The assistance of the optical imaging system VK makes it possible to respectively acquire an optical image or, respectively, projection image for the two optical fibers CFI, AFI in at least one plane of observation and offer the image information thereof for evaluation. As a result thereof, a potential lateral offset between the two optical fibers AFI, CFI relative to one another can be acquired in the respective observation plane such as, for example, in the X, Z-image plane. The control means SL1 then instructs the actuator SG1 via the control line SL1 for a corresponding compensation of the lateral offset between the two optical fibers AFI, CFI. In this way, a potential offset of the optical fibers AFI, CFI relative to one another can be acquired multi-dimensionally, i.e. in a plurality of different planes of observation, and can be largely compensated.

The two optical fibers AFI, CFI are first positioned at a prescribable longitudinal spacing, i.e. at a gap from one another. The two optical fibers are then aligned with one another in the next step so that they are largely aligned with one another. The optical fibers AFI, CFI directly in alignment with one another in this way are then pre-welded and their softened end faces are moved into one another along a common alignment line ZA to such an extent that they are fused to one another at their end faces. The heating and melting of the fibers AFI, CFI is there by expediently implemented with the assistance of a thermal heat source TSV. To that end, for example, two welding electrodes EL1, EL2 are arranged between the two holding devices HAL, HCL so that what is referred to as an arc can form between them due to glow discharge transaxially, particularly perpendicularly to the axial longitudinal extent of the two optical fibers AFI, CFI. The course of the region in which an arc can propagate between the two electrodes EL1, EL2, which is a heating or welding region, is merely indicated in FIG. 11 in the form of an elongated, dot-dashed ellipse for the sake of graphic simplicity and is referenced LB. Whereas the electrode ELI is allocated to the one long side of the two optical fibers AFI, CFI, the electrode EL2 is located at the long side of the optical fibers AFI, CFI lying opposite the welding electrode EL1. FIG. 11 shows the two fiber ends AFI, CFI after this thermal welding for form the finished splice SS.

In order to be able to displace the separated light waveguide CLW in the Z-direction toward the optical fiber AFI, the light waveguide cable CA is expediently clamped with access length between the holding mechanism HCA and the holding mechanism HCL, so that an adequate length of the separated light waveguide CLW can be resupplied when the holding mechanism HCL moves past toward the stationarily arranged optical fiber AFI.

In addition to or independently thereof, it can also be expedient to fashion both the holding mechanism HCL for the cable light waveguide CLW as well as the holding mechanism HCA for the cable CA to be displaceable together in the longitudinal fiber direction, i.e. in the Z-direction here. No reserve length then need be kept on hand between the two holding devices HCA, HCL.

Expediently, the light waveguide section ALW extending out of the plug ST2 and/or the light waveguide CLW separated from the light waveguide cable CA to be connected respectively exhibit such a length that they can be placed into the structural length or, respectively, dimensioning rules of a light waveguide splicing apparatus of a known type. The light waveguides ALW, CLW welded to one another at the splice location SS exhibit a total length GL of preferably at least 10 mm, particularly between 20 and 200 mm, and preferably about 100 mm, from the end of the plug shank STS2 up to the breakage or cut edge of the outside sheath AH of the optical lead CBA, i.e. the exit location of the light waveguide CLW from the light waveguide cable CA.

In that a respective light waveguide extends both from the plug as well as from the light waveguide cable to be connected, the splice location SS also lies between the connecting light waveguide and the cable light waveguide outside of the plug as was other disturbing component parts, i.e. the splice location SS between the connecting light waveguide ALW and the separated light waveguide CLW of the cable CA is freely accessible, which simplifies the assembly work for splicing the plug ST2 on. In particular, the welding process is facilitated since splicing can be carried out with the existing electrode arrangement of standard light waveguide welding apparatus.

After the connecting optical fiber AFI has been thermally welded to the cable optical fiber CFI, the splice protection sleeve SU, which was kept on hand on the connecting light waveguide ALW is slipped over the de-coated optical fibers AFI, CFI, so that the sleeve SU at least covers the splice region SS thereof from the outside. The splice protection sleeve SU preferably extends at least so far in longitudinal fiber direction that it envelopes the de-coated longitudinal sections of the two optical fibers AFI, CFI from the outside. With the employment of a shrink hose as a splice protection sleeve SU, the sleeve SU is expediently shrunken onto the longitudinal sections of the two bare optical fibers AFI, CFI. This can preferably ensue with the assistance of a shrink furnace SO that is additionally entered dot-dashed in FIG. 11 and is removably mounted at the base plate GP in the splice region.

Figure 12:
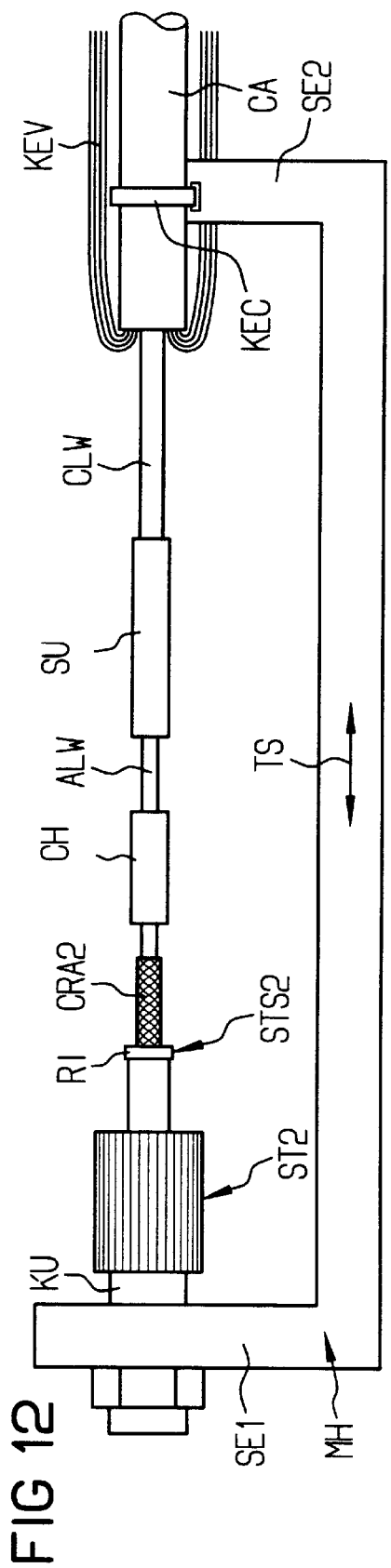
FIGS. 12 and 13 are schematic side views of an assembly auxiliary means with whose assistance a strain relief can be placed from the light waveguide cable to the light waveguide plug spliced thereto according to FIG. 11.

In order to be able to envelop the two welded-together optical fibers AFI, CFI from the outside in a simple way, it can be expedient to place the light waveguide cable CA as well as the plug ST2 attached to the end side thereof into a mounting device MH (see FIG. 12). It can preferably be a component part of the light waveguide splicing apparatus SG. It can preferably be removed from and reinserted into the splicing device. In a side view, the mounting mechanism MH exhibits a U-shaped profile in a first approximation. A coupling KU for the insertion of the plug ST2 is provided at one of the lateral legs SE1, SE2. A clamp mechanism KEC for the light waveguide cable CA is provided at the opposite leg SE2 of the U-profiled mounting mechanism MH, and the cable CA being capable of being fixed at its outside cladding AM with the assistance thereof. The coupling KU for the plug ST2 is preferably fashioned corresponding to a light waveguide jack in which the plug ST2 can be plugged. The mounting mechanism MH is preferably fashioned so that the plug ST2 as well as the light waveguide cable CA can be held at the outside cladding and their light waveguides ALW, CLW extend stretched essentially on a straight line between the legs SE1, SE2. Expediently, the length of the U-profiled holder MH is adjustable for different lengths of the light waveguides of the plug and of the light waveguide cable to be welded to one another. This length variation of the mounting mechanisms MH is indicated by a double arrow TS.

After the welding of the cable light waveguide CLW to the connecting light waveguide ALW, thus, both the plug ST2 as well as the light waveguide cable CA are removed from the shrink furnace SO as well as from the welding device TSV of FIG. 11 and are secured in the mounting mechanism MH. The mounting mechanism MH makes it easier to conduct the strain relief elements KEV of the light waveguide cable CA that have been removed and laid-back over the splice location of the light waveguides ALW, CLW and secure them to the plug.

Figure 13:
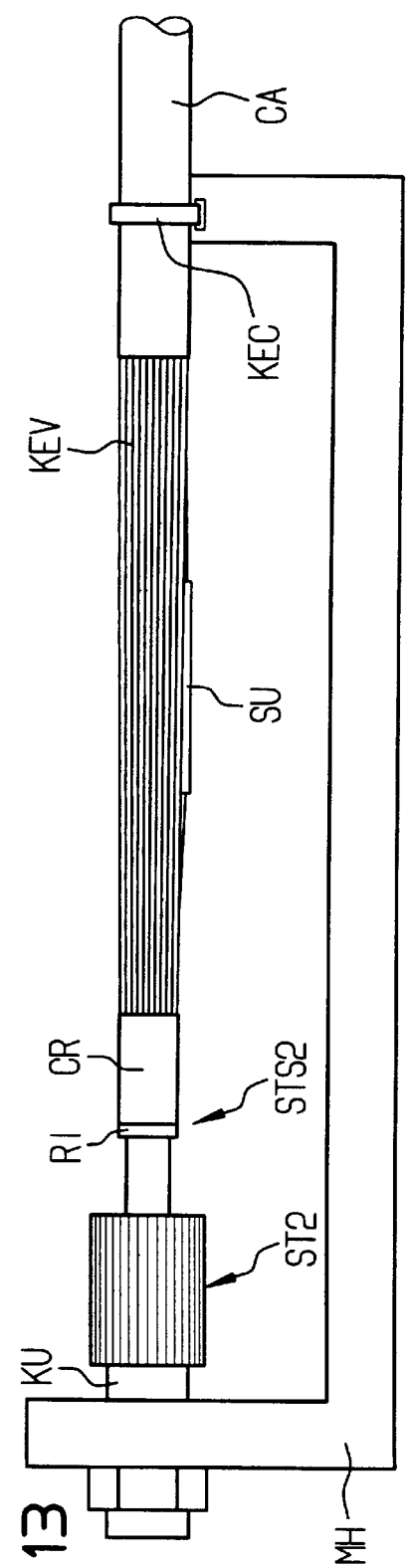
Figure 14:
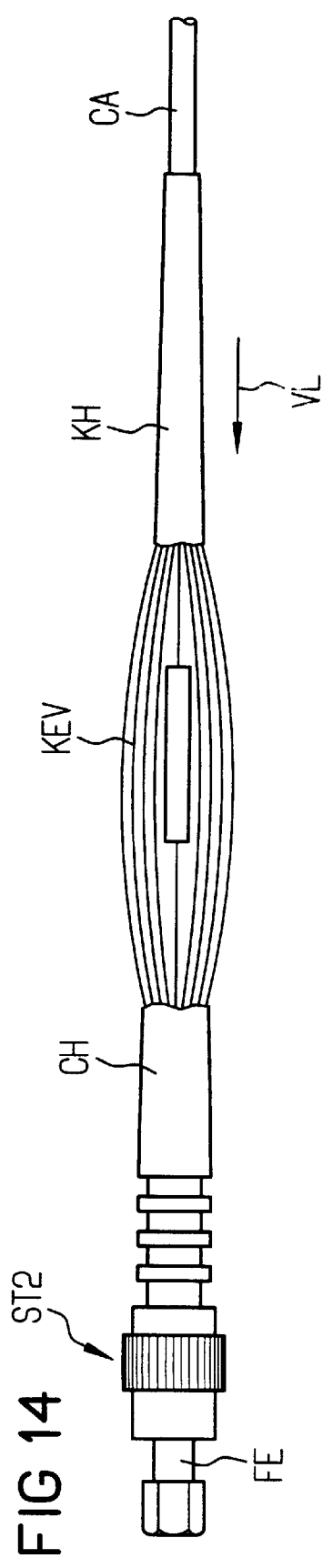
FIG. 14 is a schematic side view of the light waveguide cable of FIG. 9 with the plug connected tithe end after application of the strain relief according to the assembly process according to FIGS. 11 through 13.

In a next assembly step, the strain relief elements KEV are conducted on an essentially straight line along the longitudinal extent of the two welded-together light waveguides ALW, CLW to the plug shank STS2. The strain relief elements KEV thus extend from their exit location from the cable cladding of the light waveguide cable CA up to the plug shank STS2. The strain relief elements KEV are preferably cut to such a length that they extend stretched on a straight line up to the attachment ring RI. They are threaded or pushed through the crimp sleeve CH and are placed onto the crimp shoulder CRA2 of the plug shank STS2. Subsequently, the crimp sleeve CH is pushed over the crimp shoulder CRA2 and crimped firmly onto it to form a crushed or attached crimp sleeve CR. In this way, the strain relief elements KEV are firmly pressed on the crimp shoulder CRA2 of the plug ST2 and are retained thereat. The stop ring RI thereby forms a fixed longitudinal detent for the sleeve CR, so that this terminates largely flush in an axial direction with the attachment or locking ring RI with respect to the outside contours. The crimped sleeve CR can be supported at the attachment ring RI in a longitudinal cable direction. For fastening the strain relief elements KEV to the plug ST2, the strain relief elements KEV are expediently arranged optimally uniformly around the outside circumference of the light waveguides ALW, CLW, so that a type of strain relief sheath can be prepared all around the welded-together light waveguides ALW, CLW. FIG. 13 illustrates this assembly work in a schematic illustration. A greater overall length in the region between the plug ST2 and the breakage edge of the outside cladding AM of the light waveguide cable CA is expediently selected for the welded-together light waveguides ALW, CLW than for the strain relief elements KEV. What this means in other words is that the two welded-together light waveguides ALW, CLW exhibit an excess length compared to the strain relief elements KEV.

In that the strain relief elements KEV of the light waveguide cable CA are conducted across the splice location SS to the plug ST2 and are secured thereto, a strain relief is offered both for the splice as well as the plug. When, for instance, a tensile force is applied to the plug ST2, then this is dissipated in longitudinal cable direction via the tensed strain relief elements KEV. Inadmissibly high tensile stresses of the splice location SS are thereby reliably avoided. The plug connector provided in this way with a strain relief is ultimately removed from the assembly device MH of FIG. 13.

After the fastening of the strain relief elements KEV with the assistance of the crimped sleeve CR at the plug shank STS2, the anti-buckling socket, sheath or sleeve KH is finally also pulled on at the outside, this, of course, having been slipped over the outside cladding AM of the light waveguide cable CA during the advance preparation. Pulling the anti-buckling sheath KH forward up to the plug head SK2 is indicated by a motion arrow VL in FIG. 14. The anti-buckling socket KH is preferably fashioned circular-cylindrical. It can preferably be coated on the inside with an adhesive or melt adhesive, so that it remains adhering to the plug shank STS2 as well as to the outside cable cladding AM. The anti-buckling socket KH is preferably pulled forward up to the breakage edge of the plug head SK, so that it terminates flush thereat. The anti-buckling sheath KH preferably extends from the plug head SK2 at least up to the beginning of the outside cladding AM of the connected light waveguide cable CA. The anti-buckling sheath preferably comprises a longitudinal extent of at least 80 mm, particularly between 80 and 200 mm, and preferably about 120 mm. A flexible, soft plastic material is expediently selected for the anti-buckling sleeve in order to be able to assure an adequate flexibility in the transition region between the rigid plug housing and the light waveguide cable CA. A plastic material such as, for example, polyethylene is preferably selected for the anti-buckling sheath KH.

Figure 15:
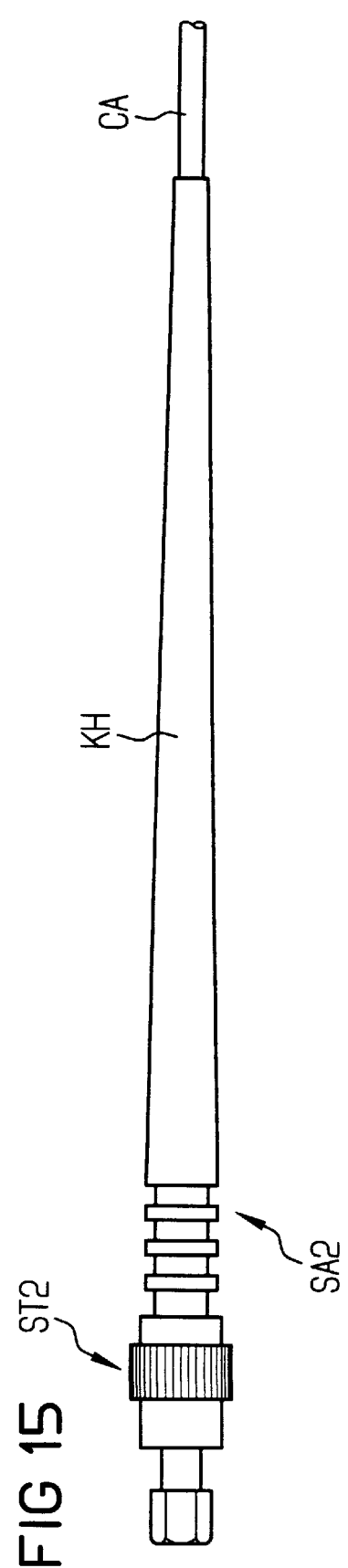
FIG. 15 is a schematic side view of the finished plug connection for the light waveguide cable of FIG. 7.

The anti-buckling sheath KH thus completely covers the two welded-together light waveguides ALW, CLW from the outside and their splice protection sleeve SU and the strain relief elements KEV are conducted over them. FIG. 15 shows the finished plug connector SA2 for the light waveguide cable CA that has been produced.

The length of the connecting light waveguide extending out of the plug is expediently selected so that the splice location thereof to the cable light waveguide to be welded on does not lie directly in the region of the plug shank end but outside the zone of the plug connector that is subject to buckling. The closer, namely, the splice location moves to the rigid plug shank end, the risk of an over-stressing due to buckling would become all the greater. In order to avoid inadmissibly high buckling forces on the splice location insofar as possible, the length of the connecting light waveguide ALW is expediently selected at least 50 mm, particularly between 50 and 100 mm, and preferably about 65 mm. What this means in other words is that the splice location is selected at least 50 mm, particularly between 50 and 100 mm, from the plug shank end.

Differing from the first, advantageous plug connector principle according to FIGS. 1 through 6, the coating mechanism for re-coating the optical fibers can be advantageously omitted for producing the plug connector according to FIGS. 7 through 15. Instead of this, a splice protection sleeve is advantageously pulled directly over the splice location as well as the exposed optical fibers after the splice location has been finished. This facilitates the assembly work. The plug connector, namely, can be particularly fabricated with the standard components of a conventional light waveguide splicing apparatus of a known type that are already present.

Figure 16:
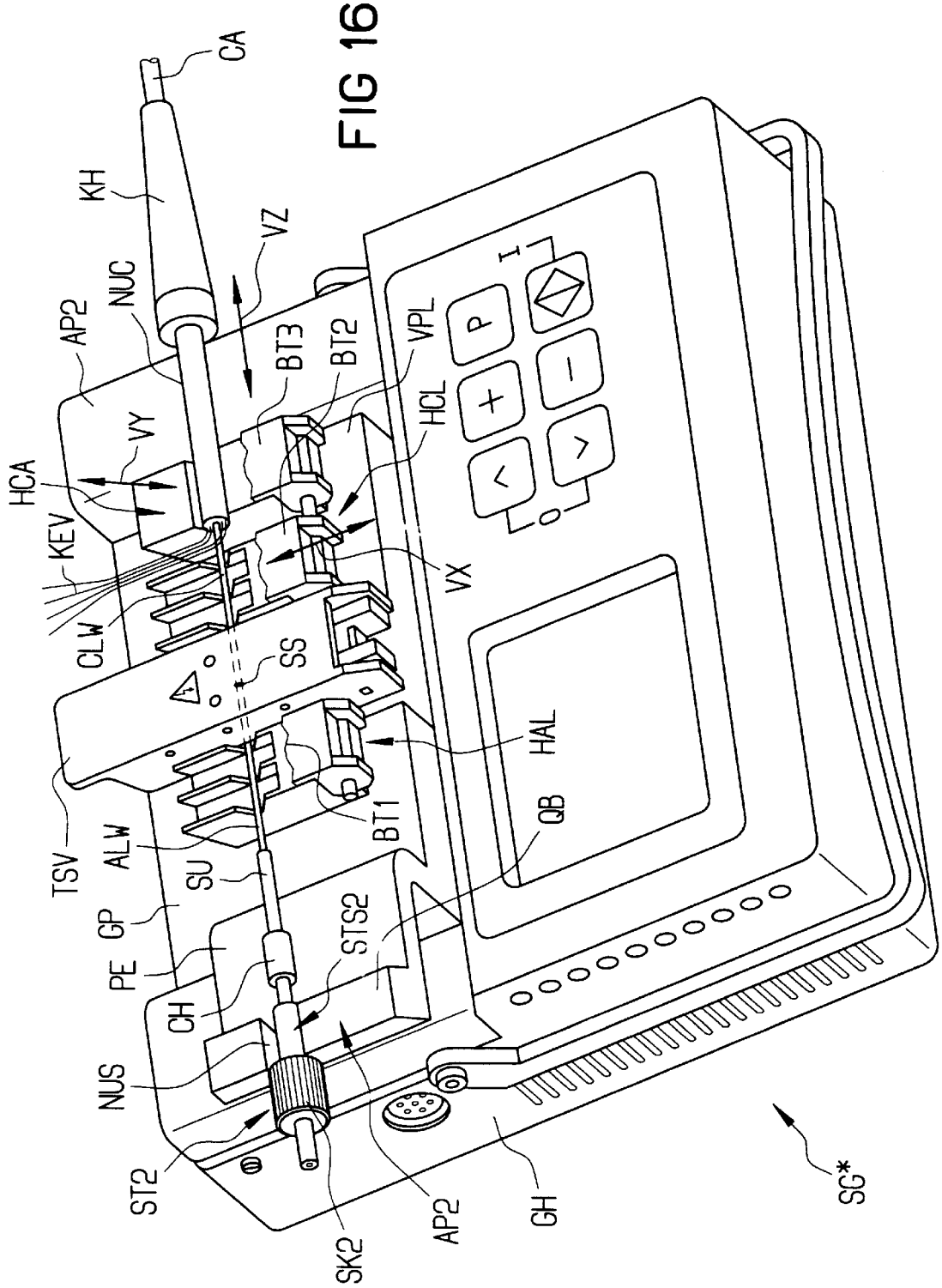
FIG. 16 is a schematic, perspective view of a modified light waveguide welding apparatus with a receptacle device for the plug and the light waveguide cable.

FIG. 16 schematically shows a perspective illustration of a light waveguide splicing apparatus SG* that, compared to the splicing device SG of FIG. 11, comprises modified receptacle or, respectively, holding devices for the plug ST2, its connecting light waveguide ALW, the light waveguide cable CA to be connected as well as the light waveguide CLW separated therefrom.

For a better illustration of how the plug ST2 with the extending connecting light waveguide ALW, how the separated light waveguide CLW of the cable CA to be connected, as well as how the fully clad cable end CA itself are accepted by the holding devices of the splicing device, the holding devices or, respectively, receptacle devices AP2, HAL, HCL, HCA are respectively shown without covers. The welding mechanism TSV is fashioned as a flap in FIG. 16 that can be pivoted over the splice location SS of the two light waveguides ALW, CLW which are to be welded to one another. It is shown in its welding position. It is preferably positioned roughly in the center of the work table GP.

All holding devices are elevated in the Y-direction relative to the planar work table GP of the splicing device SG*. The plug deposit AP2 is provided in the left-hand part of the work table GP of the splicing device SG*. It is preferably replaceably mounted thereat in order to be able to attach a respectively correspondingly adapted plug deposit for different plug types as well as plug sizes. At its outside, i.e. facing away from the splice location, it comprises a laterally proceeding transverse jaw QB with a longitudinal channel NUS in which the plug shank STS2 is preferably held largely positively locked. The transverse jaw QB thereby forms an elevation relative to the otherwise largely planar deposit plane PE of the plug deposit AP2 on which the connecting light waveguide ALW is placed freely mobile. The plug head SK2 projects freely from the transverse jaw QB facing away from the splice location. Since it exhibits a larger outside diameter than the plug shank STS2, the outside of the transverse jaw QB effects an axial detent against displacement in the Z-direction toward the splice location SS. The plug deposit AP2 is preferably stationary, i.e. attached immobile in the X, Y, Z-directions. It preferably terminates flush with the outside edge of the splicing device housing GH.

In the direction toward the welding mechanism TSV, the holding device HAL for the connecting light waveguide ALW is attached on the work table GP with a longitudinal spacing from the plug deposit AP2. It is positioned directly, i.e. flush next to the welding mechanism TSV. In this way, enough space is present in the interspace between the transverse jaw QB of the plug deposit AP2 and the holding device HAL in order to be able to keep the crimp sleeve CH as well as the splice protection sleeve SU on the connecting light waveguide ALW. The crimp sleeve CH as well as the splice protection sleeve SU are thereby arranged next to one another in longitudinal direction of the connecting light waveguide ALW. The crimp sleeve CH is seated farther toward the outside on the connecting light waveguide ALW then the splice protection sleeve SU with reference to the splice location SS, i.e. the crimp sleeve has a position closer to the plug ST2. The holding mechanism HCL is arranged approximately axially symmetrically relative to the holding mechanism HAL at the other side of the welding mechanism TSV, and, as illustrated, is on the right-hand side. With reference to the topical position of the welding apparatus TSV, the holding mechanism HCA for the light waveguide cable CA is placed farther toward the outside then the holding mechanism HCL as viewed in the longitudinal cable direction.

It serves the purpose of positional fixing or, respectively, clamping the fully clad cable CA as well as its strain relief elements KEV fast. For better guidance of the cable CA. an additional table-like cable deposit AP2 is provided in the region of the right-hand outside edge of the splicing apparatus housing GH, the cable CA being capable of being inserted with a form fit into the longitudinal channel NUC of the additional cable deposit AP2. To that end, the inside contour of the semicircular-cylindrical longitudinal channel NUC is expediently selected approximately equal to the embraced outside contour of the outside cable cladding AM. The anti-buckling sheath KH, finally, is kept on the cable CA outside the splicing apparatus SG*. Given this modified splicing apparatus SG*, in particular, only the plug deposit AP2, the holding device HCH for the cable CA as well as the cable deposit AP2 are provided in addition to the standard components of a splicing apparatus of a traditional type. They are preferably replaceably mounted on the work table GP of the splicing apparatus in order to be able to offer modules with correspondingly large, adapted receptacle longitudinal channels for different plug types, particularly plug sizes, as well as for different cable types, particularly outside cable diameters.

The holding devices HAL, HCL, which are arranged—preferably largely axially symmetrically—at both sides of the welding device TSV, as well as the welding device itself, by contrast, can be advantageously retained as standard components of a previous splicing apparatus as is, for example without any structural modifications. In this way, a traditional splicing apparatus can be structurally supplemented in a simple way that the fabrication of the inventive plug connection becomes possible.

Differing from FIG. 11, both the holding device HCL as well as the holding device HCA are attached on a common carriage VPL in FIG. 16 that is displaceable in the Z-direction. It can also be potentially expedient to fashion the holding device HAL displaceable in the Z-direction of the double-arrow VZ. By contrast to FIG. 11, for example it can be particularly expedient to allow the holding device HCL to execute a lateral displacement motion in the X-direction but to allow the holding device HCA to execute a lateral displacement motion only in the Y-direction as well, which is indicated by appertaining double arrows VX, VY.

In particular, the inventive plug connector allows the simple as well as dependable fabrication of different light waveguide cable types with different plug types according to the same basic principle. What is thereby understood by the term light waveguide cable is at least one light waveguide along which at least one strain relief element proceeds. The respective strain relief element, for example, can thus already be formed by a tensile plastic sheath that surrounds the light waveguide that is to be connected. For example, a rip thread or some other tensile enveloping element also comes into consideration as a strain relief element that runs along the respective light waveguide that is to be connected.

A development of the invention is particularly based on the further object of disclosing a way of how a plug can be attached to a light waveguide cable in a simple and dependable way. This object is particularly achieved in that a plug sleeve is pushed onto the light waveguide cable to such an extent that a prescribable end section of the light waveguide cable projects from the plug sleeve at the face end, that at least one optical fiber from this projecting end section of the light waveguide cable is uncovered over a prescribable length, that at least one connecting optical fiber is kept on hand in a separate plug pin and extends out of this with a prescribable longitudinal section, that the optical fiber of the light waveguide cable projecting from the plug sleeve and the allocated connecting optical fiber extending out of the plug pin have their end faces aligned to one another and are spliced to one another at a freely accessible splice location outside the plug sleeve and outside the plug pin, that the plug sleeve is pushed over the optical fibers which are spliced to one another after the splice has been produced, and that only then is the plug pin inserted into the plug sleeve upon formation of a plug.

As a result thereof, a plug can be advantageously mounted to a light waveguide cable under a multitude of practical conditions in a simple and reliable way. Since the splice location between the optical fiber of the light waveguide cable to be connected and the connecting optical fiber of the plug pin can be kept freely accessible the splicing process between these two optical fibers is simplified. Since the plug is not assembled until after the production of the splice, the connection of the plug to the light waveguide cable is simplified due to the improved manipulation.

A further development of the invention is also directed to a plug connector for at least one light waveguide of a light waveguide cable upon employment of a plug that is particularly characterized in that a plug sleeve is provided that can be slipped onto the light waveguide cable to such an extent that a prescribable end section of the light waveguide cable projects from the plug sleeve at the end face, that a separate plug pin is provided in which at least one connecting optical fiber is kept on hand and extends out therefrom with a prescribable longitudinal section, and that the plug pin can be inserted such into the plug sleeve upon formation of an optical plug that the plug sleeve surrounds the connecting optical fiber and at least one optical fiber separated from the light waveguide cable from the outside after they have been spliced.

In a schematic as well as magnified longitudinal sectional view, FIG. 17 shows a first, completely finished plug connector SA1 for a light waveguide cable CA upon employment of a light waveguide plug ST. FIG. 18 as well as 19 are magnified views illustrating the assembly steps with which the light waveguide cable CA can be fabricated with the light waveguide plug ST, i.e. equipped or, respectively, terminated at the end.

The light waveguide cable CA is preferably fashioned as a type of optical fixed lead. It comprises an individual optical lead OA roughly in its center. This optical lead OA is formed by a light waveguide CLW that is additionally covered with a plastic sheath AH. The light waveguide CLW comprises an individual optical fiber CFI that extends along an imaginary central axis ZA entered dot-dashed in FIG. 17. What is referred to as a monomode fiber is particularly employed for this optical fiber CFI. At least one plastic layer CCO, particularly what is referred to as a primary and secondary coating, is applied on the cladding glass of this optical fiber CFI and surrounds it on all sides. A single-layer or multi-layer outside cable cladding AM is firmly seated on the optical lead OA. The outside cable cladding AM is preferably formed by an extruded plastic envelope in which a plurality of strain relief KEV are embedded. The strain relief elements KEV are thereby preferably arranged around the optical lead OA in the outside cable cladding AM in the form of at least one sheath. In particular, the strain relief elements KEV are applied single-layer or multi-layer on the outside surface of the optical lead OA. They preferably proceed in longitudinal cable direction. The strain relief elements KEV are preferably formed by reinforcing fibers, particularly Kevlar threads or aramide yarns. The optical fibers CFI is preferably fashioned approximately circular-cylindrical. Viewed radially from inside to outside, it is essentially concentrically surrounded by its coating layers CCO, by the lead plastic sheath AH, by one or more plies of strain relief elements as well as by the outside cable cladding AM. These envelopes CCO, AH, KEV as well as AM are thereby preferably fashioned essentially tubularly, particularly circular-cylindrical. Such light waveguide cable structures comprise an outside diameter in practice of preferably between 2 and 10 mm. and preferably around approximately 3 mm.

For fitting this light waveguide cable CA with the plug ST. at least one cover sheath or, respectively, sleeve is initially additionally pushed over the free end of the as yet unprepared light waveguide cable CA onto the outside cladding AM thereof in advance as a first step. In FIG. 18, both a crimp sleeve CH as well as an anti-buckling sheath KH are kept on hand on the outside cladding AM of the light waveguide cable CA. For the sake of graphic simplicity, the crimp sleeve CH as well as the anti-buckling sheath KH are respectively shown only along a sub-length of their overall longitudinal extent. The crimp sleeve CH as well as the anti-buckling sheath KH are respectively essentially circular-cylindrically fashioned, whereby they surround the light waveguide cable CA approximately concentrically. The anti-buckling sheath KH expediently comprises a larger inside diameter then the crimp sleeve CH, so that it can be pushed over the crimp sleeve CH. The crimp sleeve CH as well as the anti-buckling sheath KH are expediently pushed onto the light waveguide cable CA so far that a prescribable end length CEL of the cable CA is freely accessible for an assembler or an operator.

After the crimp sleeve CH as well as the anti-buckling sheath KH have been pulled over the light waveguide cable CA, a plug sleeve SH is finally pushed onto the outside cladding AM of the light waveguide cable CA proceeding from the free end thereof. This plug sleeve SH is tubularly fashioned, particularly circular-cylindrical in a first approximation, and extends in a straight line in a first approximation. Its outside diameter is selected smaller than the inside diameter of the tubular crimp sleeve CH, so that it can be inserted into the crimp sleeve CH. At the end facing toward the free end of the light waveguide cable CA, the outside of the plug sleeve SH has a coupling part KU for later coupling to a corresponding plug jack of a known type. The coupling part KU is spring-loaded in an axial direction with a compression spring DF, i.e. along the longitudinal extent of the plug sleeve SH. The spring acts between a ring or shoulder at an end or opening KO of the sleeve SH and biases the part KU against a retainer ring HR that is firmly attached to the outside circumference of the plug sleeve SH. The plug sleeve SH, the crimp sleeve CH as well as the anti-buckling sleeve KH are expediently pushed onto the light waveguide cable CA to such an extent that a prescribable end length SEL (see FIG. 18) of the light waveguide cable CA extends freely out from the plug sleeve SH.

In a next method step, the end section SEL of the light waveguide cable CA projecting from the plug sleeve SH is stripped layer-by-layer from outside to inside. In detail, the outside cladding AM, particularly the plastic cladding of the cable CA, is thereby removed at the end section along a prescribable longitudinal section EC. The outside cable cladding AM is preferably removed along an end length EC of between 40 and 60 mm from the free cable end. As a result of the removal of the cable cladding AM, the plurality of strain relief elements KEV that cover the outside plastic sheath All of the individual optical lead OA are uncovered immediately thereunder. These strain relief elements KEV uncovered along the predetermined stripping length are expediently laid back away from the cable end and in the opposite longitudinal direction of the cable CA in the direction toward the outside cladding thereof. In particular, they are bent back by approximately 180° from their parallel course relative to the central cable axis ZA away from the cable end directly where they emerge from the outside plastic cladding AM, i.e. at the breakage or cut edge thereof to the uncovered optical lead OA. Subsequently, the outside plastic sheath AH of the optical lead OA is removed over a prescribable end length ALE proceeding from the end face of the optical lead OA. A remaining length RL of the optical lead OA removed from the outside cable cladding AM thereby continues to be clad by the outside plastic sheath AH. In this way, the remaining length RL of the outside lead sheath AH projecting from the outside cladding AM of the cable CA forms a type of connection section that simplifies the later, mechanical longitudinal coupling and fastening of the elongated plug sleeve SH to the light waveguide cable CA. By removing the outside lead sheath AH, the individual light waveguide CLW is exposed, which proceeds essentially along the central axis ZA of the light waveguide cable CA.

The cable end is expediently made ready to splice with the following dimension:

A remaining length RL of between 2 and 5 mm is left on the separated lead OA for the outside plastic sheath AH of the optical lead OA. An end length ALE of between 10 and 30 mm, particularly between 10 and 20 mm, and preferably of about 15 mm, is selected for the light waveguide CLW preferably from the breakage or cut edge of the outside lead sheath AH up to the end face of its optical fiber CFI.

The light waveguide CLW is preferably removed from the cable envelopes AM, AH over such a great length that this uncovered light waveguide section can be placed into the receptacles or manipulators of a light waveguide welding apparatus of a known type. FIG. 18 illustrates this assembly condition of the light waveguide cable CA. There, the light waveguide CLW is held and positionally fixed in a holding mechanism HA2 of a known type (such as, for example, manipulators) of a welding apparatus SV. The welding apparatus SV is thereby preferably a component part of a light waveguide welding apparatus. For better illustration of the fixing effect of the holding mechanism HA2, this is shown in its opened condition and comprises a base part BT2 on whose upper surface has a longitudinal channel NU2. The coated (equals plastic coated) light waveguide CLW is placed into the longitudinal channel NU2. A flat or cover KL2 that can be pivoted in the direction toward the base part BT2 is attached to the base part BT2 via an articulation GL2, hinge or the like. A longitudinal channel LN2 topically corresponding to the longitudinal channel NU2 in the base part BT2 is provided on the inside surface of the cover KL2. After closing the holding mechanism HA2, thus, the light waveguide CLW is clamped between the base part BT2 and the cover KL2 and is held fast therein.

Expediently, the light waveguide CLW is freed of its outside plastic coating CCO, particularly its primary and secondary coating, along a prescribable sub-length FLE proceeding from the end face before insertion into the holding device HA2, so that the optical fiber CFI is exposed bare over a prescribable end section FLE. This method step is preferably followed by a face-end preparation of the optical fiber CFI to form an approximately 90° cleavage face with reference to the longitudinal fiber axis. The uncovered optical fiber CFI is thereby brought to a prescribable end length by being cut at the end. The removal of the fiber coating expediently ensues such that the light waveguide CLW remains coated with the fiber coating along a remaining length to the region of the breakage or cut edge of the outside lead sheath AH. When the cable end is ready to be spliced, the optical fiber CFI is preferably bare over a length of between 5 and 10 mm. The optical fiber CFI projecting from the lead sheath AH preferably comprises a remaining, coated longitudinal section of between 10 and 20 mm, and particularly between 7 and 12 mm, as viewed from the fiber end face.

Before or after the insertion of the light waveguide cable CA into the light waveguide welding apparatus SV, a plug pin FE from which an optical fiber AF1 freely extends out is also placed into this apparatus SV. To that end, the plug pin FE is deposited on a table TI that is shown in the left half of the illustration of FIG. 18. This plug pin FE can also be potentially fixed in a holding mechanism that is fashioned corresponding to the holding mechanism HA2. The plug pin FE is positioned in the welding device SV lying opposite the cable end. What is referred to as a ferrule is preferably employed as the plug pin. Particularly ceramic, plastic such as, for example, Komposite®, zirconium oxide ceramic, etc., is suited as material for such a ferrule.

Along its central axis, the plug pin FE comprises a through central bore, i.e. a central bore extending from the one to the other end face, into which the optical fiber AFI is placed and fixed therein. The optical fiber AFI is preferably glued into the central bore of the plug pin FE. In particular, the plug pin FE is already pre-fabricated with the connecting optical fiber AFI at the factory. The equipping of the plug pin FE with the connecting optical fiber AFI can thus ensue under factory conditions, which assures a high fabrication quality. In particular, it is largely assured that the optical fiber AFI can be accommodated essentially centrally as well as without damage in the plug pin FE. At the jack connection side, the connecting optical fiber AFI can already have been pre-ground and pre-polished in the plug pin FE at its end face in the factory, so that further preparatory measures are avoided in the field employment.

The connecting optical fiber AFI is thus kept ready in the separate plug pin FE. It extends from this plug pin FE at the cable connection side with a prescribable end length. It preferably projects to such a great length that it can be placed into the receptacles or, respectively, holding devices (such as, for example, manipulators) of a light waveguide welding apparatus of a known type, for example, the device SV of FIG. 18. The connecting optical fiber AFI preferably extends out of the cable connection end of the plug pin FE to a length between 10 and 60 mm. In FIG. 18, this connecting optical fiber is positioned in a holding mechanism HA1 of a known type (such as, for example, a manipulator) and is held fast. The holding mechanism HA1 is thereby expediently fashioned corresponding to the holding mechanism HA2 for the light waveguide CLW of the light waveguide cable CA. Both the connecting optical fiber AFI as well as the optical fiber CFI to be spliced or welded thereto freely project from their appertaining holding devices HA1, HA2 with a prescribable end length. With the assistance of these holding devices HA1, HA2, they are positioned so that they reside opposite one another optimally aligned along an imaginary straight line such as, for example, along their longitudinal axes ZA. In order to also be able to contact the two optical fibers AFI, CFI to one another at their end faces, at least one of the two holding devices HA1, HA2 is longitudinally displaceable along this imaginary alignment line ZA. Expediently, at least one of the two holding devices HA1, HA2 is also fashioned displaceable in at least one spatial direction transversely, particularly perpendicularly to the respective longitudinal fiber axis.

It is assumed in the present example that the holding device HA2 for the light waveguide CLW of the light waveguide cable CA allows movement in all three spatial directions, namely, X, Y, Z of a Cartesian coordinate system. The spatial direction Z thereby indicates a longitudinal direction parallel to the desired alignment line ZA along which the connecting optical fiber AFI as well as the optical fiber CFI can be aligned. The two optical fibers AFI, CFI can be moved toward or away from one another along the Z-direction. In particular, the Z-direction corresponds to the desired alignment line of the two optical fibers. The spatial direction X proceeds in a transverse direction relative to the longitudinal extent of the two optical fibers, particularly perpendicularly, i.e. orthogonally to the spatial direction Z. The two holding devices HA1, HA2 are arranged on a common base plate GP. The holding device HA1 is thereby attached rigidly on the base plate, i.e. immobile, whereas the holding device HA2 allows displacement motions in all three spatial directions X, Y, Z. In particular, the planar base plate GP lies parallel to the plane erected by the X and Z spatial direction. The spatial direction Y resides perpendicular to this X, Z-plane, i.e. it proceeds up or down. The various motion possibilities of the holding device HA2 in the three spatial directions X, Y or Z are respectively schematically indicated with motion arrows VX, VY as well as VZ. The optical fiber to be welded on is aligned optimally aligning—i.e. with as little offset as possible in lateral direction with reference to the alignment line ZA—with the connecting optical fiber AFI that is stationarily arranged in the holding mechanism HA2, being aligned with the assistance of the holding means HA2. After this aligning alignment, the optical fiber CFI is moved toward the stationary connecting optical fiber AFI in the Z-direction until the two optical fibers contact at their face end. These two optical fibers freely accessible from the outside are then welded to one another in the region of their contacting end faces with the assistance of a thermal heat source. To that end, for example, two welding electrodes EL1, EL2 are allocated in FIG. 18 to the interspace between the two holding devices HA1, HA2. An arc LB can be formed by glow discharges between the two welding electrodes EL1, EL2 trans-axially, particularly perpendicularly to the straight line, axial longitudinal extent of the two optical fibers AFI, CFI. The course of the region in which a respective arc can propagate between the two electrodes EL1, EL2 (equals heating or, respectively, welding region) is merely indicated in FIG. 18 in the form of an elongated, dot-dash ellipse for the sake of graphic clarity. Whereas the electrode EL1 is allocated to the one long side of the two optical fibers AFI, CFI to be contacted with one another, the electrode EL2 is located at the long side of the optical fibers lying opposite the welding electrode EL1. The finished splice between the connecting optical fiber AFI and the optical CFI is referenced SS in FIG. 18 and is symbolically indicated by a transverse stroke.

After the implementation of the fusion welding process, the holding devices such as, for example, HA1, HA2 are opened so that the two optical fibers AFI, CFI welded to one another can be removed from the welding device SV.

In a next assembly step, the plug sleeve SH is pushed over the longitudinal section of the exposed optical fibers AFI, CFI welded to one another, particularly at least over their splice SS. This displacement motion of the plug sleeve SH in the direction toward the plug pin FE as indicated in FIG. 18 by a directional arrow VL1. The elongated plug sleeve SH is thus pushed over the splice SS in the direction of the plug pin FE so far that it covers the exposed optical fibers AFI, CFI along their longitudinal extent and ends at the cable connection side approximately in that region where the strain relief elements KEV emerge from the cladding structure AM of the light waveguide cable CA stripped at its end side. The plug sleeve SH thereby comprises a longitudinal extent that at least corresponds to the overall length of the subsection of the connecting optical fiber AFI that hangs out and of the separated sub-section of the optical lead OA. In a schematic as well as magnified longitudinal sectional view, FIG. 19 shows this assembly condition of the light waveguide cable CA. As warranted, the plug sleeve SH can also be selected so long that it envelops or covers only a sub-section of the outside circumference of the light waveguide cable CA from the outside.

After the plug sleeve SH has been slipped over the finished splice SS the plug pin FE is plugged into the front side in the plug sleeve SH.

In a schematic longitudinal sectional view, FIG. 19 illustrates the insertion of the plug pin FE into the conically shaped admission opening KO of the plug sleeve SH. The insertion motion of the plug pin FE is indicated therein by a directional arrow VR1 toward the right toward the plug sleeve SH.

For fixing the plug pin FE in the pug sleeve SH, the plug pin FE comprises a radially projecting positioning ring PR at its cable connection end all around its outside circumference that is attached firmly thereat. With this positioning ring PR, the plug pin FE is pressed into the conical admission opening KO of the plug sleeve SH. The plug pin FE is thereby seated in the admission opening KO of the plug sleeve SH with a press seat or press fit.

Viewed generally, the various components of the light waveguide plug ST are only assembled after the connecting optical fiber AFI extending from the plug pin at the end has been spliced to the optical fiber CFI, which was separated from the light waveguide cable CA, at a splice location SS outside the plug sleeve SH and outside the plug pin FE. As a result of the fact that the optical fiber CFI projecting from the light waveguide cable is welded to a connecting optical fiber that projects from a separate plug pin, the splice location between these two optical fibers is freely accessible. This substantially facilitates the implementation of the splicing, particularly fusion welding process for the assembler. Housing parts of the plug, namely, that would be in the way are thereby avoided.

Subsequently, the strain relief elements KEV placed back onto the outside cable cladding AM are bent forward in the direction toward the plug pin FE. The strain relief elements KEV are placed onto the outside surface of the circular-cylindrical cable connection end section or, respectively, crimp shoulder CAN of the plug sleeve SH (see FIG. 17). The strain relief elements KEV are thereby preferably stretched or, respectively, tenses in the longitudinal cable direction. They are expediently cut back to a length that approximately corresponds to the length section of the plug sleeve SH between its cable connection end face and the edge of the plug coupling part KU at the cable connection side. Expediently, the strain relief elements KEV are distributed optimally uniformly around the outside circumference of the plug sleeve SH. In this way, the strain relief elements KEV form an outside sheath of a type that was also originally available in the inside of the light waveguide cable CA.

After the strain relief elements KEV have been placed outside onto the plug sleeve SH, the crimp sleeve CH that was slipped on in the preparation of the light waveguide cable CA is pushed forward up to the coupling part KU where it strikes against the radially proceeding edge thereof. The slipping of the crimp sleeve CH over the plug sleeve SH is indicated in FIG. 18 with a directional arrow VL2. The crimp sleeve CH, after it has been slipped over the plug sleeve SH, extends from the plug coupling KU over the cable connection end of the plug sleeve SH at least up to the start of the cable cladding AM of the light waveguide cable. The crimp sleeve CH preferably also surrounds an initial section of the fully clad light waveguide cable CA. The crimp sleeve CH is firmly pressed onto the plug sleeve SH. As a result thereof, the strain relief elements KEV are retained on the plug sleeve SH and a strain relief in the longitudinal cable direction is thus offered for the plug ST.

A firm mechanical coupling of the plug ST is thus achieved in that the plug sleeve SH, after it has been pushed over the completed splice SS. is fixed to at least one covering sheath such as, for example, KEV of the light waveguide cable CA. As warranted, the crimp sleeve CH can also be pressed onto the outside cladding AM of the light waveguide cable CA. As a result thereof, the crimp sleeve CH itself offers a further mechanical connection of the plug sleeve SH to the outside cladding AM of the light waveguide cable CA in the longitudinal cable direction. Given potentially attacking tensile forces at the plug ST, these are thus forwarded by the strain relief elements KEV and/or by the crimp sleeve CH in the longitudinal cable direction onto those outer covering envelopes of the light waveguide cable CA. As a result thereof, inadmissibly high stresses of the splice location SS as well as of the connecting optical fiber and of the cable optical fiber CFI spliced thereto are largely avoided. Expressed generally, thus, the crimp sleeve CH and/or the strain relief elements KEV enable a tensile coupling of the plug ST to the light waveguide cable CA. The splice location SS as well as the optical fibers AFI, CFI welded to one another thereby remain largely free of inadmissibly high tensile forces that can potentially occur given use of the light waveguide cable CA fitted with the plug. In metallic material, aluminum is preferably selected for the crimp sleeve CH. Particularly in that the crimp sleeve CH grasps both a sub-section of the plug sleeve SH as well as a sub-section of the outside cladding AM of the light waveguide cable CH, i.e. retains them. attacking tensile forces are already forwarded onto the light waveguide cable CA by this alone. In addition to or independently thereof, a firm coupling of the plug ST to the light waveguide cable CA by the strain relief elements KEV is achieved and these are pressed onto the cable connection end sections CAN of the plug sleeve SH firmly with the crimp sleeve CH and are retained thereat.

Viewed in summary, the strain relief elements KEV and/or the crimp sleeve CH largely assure that the optical fibers remain largely stress-free in the inside of the plug connection SA1 even if a pull is exerted at the cable CA or plug ST1 in longitudinal cable direction.

In addition, the crimp sleeve CH also makes the plug connection SA1 largely mechanical stable with respect to transverse pressure in the radial direction with reference to the central cable axis ZA, so that pinchings or compressions radially inward are largely avoided.

After the crimp sleeve CH has been crimped onto the plug sleeve SH and, potentially, onto the outside cable cladding AM, the anti-buckling sheath KH, finally, is pulled forward over the crimp sleeve CH up to the coupling part KU. The pulling of the anti-buckling sheath or, respectively, socket KH over the crimp sleeve CH is thereby indicated by an arrow VL3 in FIG. 18. The anti-buckling sheath KH seals the plug connection SA1 from the outside. It is preferably flexible and bendable, so that damage to the plug connection SA1, particularly to the inwardly disposed optical fibers welded to one another as a result of potentially occurring bending or buckling stresses are largely avoided. A plastic material, particularly an elastic, flexible plastic such as, for example, PVC or PU in flame resistant non-corrosive embodiment is preferably selected for the anti-buckling sheath KH. The anti-buckling sheath KH is preferably tubularly fashioned with a circular-cylindrical shape. It can preferably be coated with an adhesive or melt adhesive at the inside, so that it remains adhering on the crimp sleeve CH as well as the outside cable cladding AM. It preferably extends from the cable connection-side edge of the coupling part KU at least as far as the crimp sleeve CH extends in the direction of the fully clad cable CA. In FIG. 17, the anti-buckling sleeve KH extends over a greater length then the crimp sleeve CH. A longitudinal extent between 15 and 25 mm is preferably selected for the crimp sleeve CH. A longitudinal extent between 28 and 50 mm is expediently selected for the anti-buckling sheath KH.

After the application of the anti-buckling sheath KH, a plug connection SA1 has been formed that exhibits approximately the same mechanical properties as the original light waveguide cable CA.

The interior of the plug sleeve SH with the optical fibers AFI, CFI accommodated therein is terminated at the connection side by the plug pin FE and is terminated at the cable connection side by the fully clad cable CA introduced into the crimp sleeve CH. As a result thereof, a complete enveloping of the fusion splice SS by the housing of the plug sleeve SH is established. A diffusion, i.e. penetration of hydrogen into this interior is largely avoided as a result thereof and an undesired contamination of the bare optical fibers by an OH group diffusion is effectively opposed. The interior of the plug sleeve SH can be terminated largely air-tight by the plug pin FE inserted in the fashion of a fit seat at the one side as well as, in particular, by crimping the cable CH fast in the crimp sleeve CH at the other side. When Kevlar threads are employed as strain relief elements of the cable, then these advantageously act hygroscopically in the transition region between the edge of the outside cable cladding AM and the end of the plug sleeve SH at the cable connection side. When the crimp sleeve CH is firmly crimped both onto an end section of the plug sleeve SH as well as onto a starting section of the outside cladding AM of the light waveguide cable CA, then an especially tight termination of the plug connection SA1 at the cable side is advantageously achieved. The interior of the plug sleeve SH can thus be kept largely hydrogen-free. In this way, it is not necessary to introduce additional moisture-preventing means such as, for example, a thixotropic agent into the plug sleeve.

The inventive plug connection is particularly distinguished by a simple assembly that comprises only a few manipulations in order to respectively fit a cable with a light waveguide plug in a durably functional way.

In a schematic as well as magnified longitudinal sectional view, FIG. 20 shows a modified plug connection SA2 after the assembly of its components. Differing from the connection SA1 of FIG. 17, the fully clad cable CA is now also pushed into the plug sleeve SH with its cable cladding AM. As a result thereof, the crimp sleeve CH simultaneously embraces the outside cable cladding AM as well as the plug sleeve SH as viewed radially from the outside to the inside. The strain relief elements KEV given the plug connection SA2 of FIG. 20 are cutoff directly where they emerge from the outside cable cladding AM. Given the plug connection SA2 of FIG. 20, thus, the longitudinal coupling of the plug ST to the cable CA is effected only by the crimp sleeve CH. As viewed radially from outside to inside, this is seated firmly crimped both on an end section of the plug sleeve SH as well as on a sub-section at the end of the outside cable cladding AM.

An inventive plug connection can, in particular, be produced by the following time sequence of assembly steps:
(a) the plug pin provided with a front and back protection elements (not shown in FIGS. 17 through 20 for the sake of clarity) is freed of these protection elements and inserted into a light waveguide welding apparatus.

(b) the anti-buckling sheath, the crimp sleeve as well as the plug sleeve are pushed over the light waveguide cable end which is to be connected.
(c) the free cable end is stripped layer-by-layer along a prescribable end length.
(d) the optical fiber released from the light waveguide cable is likewise placed into the welding device.
(e) with the assistance of the welding device, the optical fibers extending out of the plug pin as well as the uncovered cable optical fiber are welded to one another.
(f) after the welding process, the two welded together optical fibers are removed from the welding device.
(g) the plug pin is pressed into a free admission opening of the plug sleeve.
(h) the strain relief elements, particularly the Kevlar threads, in the cladding structure of the light waveguide cable are placed onto the plug sleeve, the crimp sleeve already placed on the cable is then pushed over the Kevlar threads and pressed onto the plug sleeve.
(i) finally, the anti-buckling sheath is slipped on over the compressed crimp sleeve and fixed thereat.

Of course, the plug according to the inventive principle can also be mounted to a light waveguide of a light waveguide cable that contains not only a single light waveguide (like the cable CA in FIGS. 17 through 20) in its inside but a plurality of light waveguides, i.e. several light waveguides. The plug can also be mounted on a bare optical fixed lead, wherein the outside plastic cladding AM and/or the sheath of strain relief elements KEV in the light waveguide cable CA of FIG. 17 would be omitted. In the scope of the invention, thus, the term "light waveguide cable" means a cable with at least one light or optical waveguide along with at least one strain relief element. The strain relief element can thereby also already be formed by a tensile plastic sheath that is seated on the light waveguide or by some other tensile covering element such as, for example, a tear thread in the light waveguide cable structure.

In addition, it can potentially be expedient to connect the optical fibers such as, for example, CFI, separated from the cable such as, for example, CA to the connecting optical fiber such as, for example, AFI of the plug pin such as, for example, FE not by fusion welding but with a sleeve, adhesive or in some other way.

It can also be potentially expedient to have a connecting light waveguide extend out of the plug pin instead of a connecting optical fiber that is already bare. As a result thereof, the optical fiber of the connecting waveguide continue to be protected by its plastic coating during transport. Only when being spliced is such a connecting light waveguide then expediently freed of its plastic coating along an end portion.

Although various minor modifications may be suggested by those versed in the art, it should be understood that we wish to embody within the scope of the patent granted hereon all such modifications as reasonably and properly come within the scope of our contribution to the art.

We claim:

1. A plug comprising a plug member with a connecting light waveguide extending out of the plug member to such an extent that it can be spliced to an end face of a light waveguide of a light waveguide cable, and wherein at least one strain relief element of the cable can be conducted across the splice to the plug member and can be coupled thereto so that a strain relief is provided for the splice.

2. A plug according to claim 1, wherein the connecting light waveguide extends out of the plug member with such a length that the plug with the plug member and connecting light waveguide can be placed into at least one receptacle means of a light waveguide splicing apparatus.

3. A plug connection for a light waveguide of a light waveguide cable comprising a cable with at least one light waveguide extending from an end thereof, a plug, said plug comprising a plug member with a connecting light waveguide extending from one side thereof with an end of an optical fiber of the connecting light waveguide being spliced to an end of an optical fiber of the light waveguide of a light waveguide cable outside of said plug member, and at least one strain relief element of the light waveguide cable being conducted across the splice and being coupled to the plug member so that strain relief is offered for the splice.

4. A plug connection according to claim 3, wherein the plug member with the connecting light waveguide is prefabricated at a factory.

5. A plug connection according to claim 3, wherein the connecting light waveguide extends out of the plug member with a prescribable longitudinal section and a portion of the light waveguide of the light waveguide cable has a prescribable longitudinal section free of other cable material, the connecting light waveguide of the plug member and the light waveguide of the light waveguide cable are, respectively, freed of their respective coating materials along a prescribable end section to expose the two optical fibers, the two exposed optical fibers are connected to one another at their end faces outside of the plug member to form the splice.

6. A plug connection according to claim 3, wherein the light waveguide cable is formed by an individual light waveguide having at least one outside sheath surrounding the light waveguide on which at least one sheath of strain relief elements as well as at least one outside plastic cladding are applied.

7. A plug connection according to claim 3, which includes a recoating of a material corresponding to the original coating material for the light waveguides surrounding the optical waveguides in the region of the splice.

8. A plug connection according to claim 7, wherein the strain relief elements of the light waveguide cable are applied at least in a ply outside of the optical fibers provided with the recoating.

9. A plug connection according to claim 8, wherein at least one crimp sleeve and an anti-buckling sheath are applied on the outside of the ply with the strain relief elements.

10. A plug connection according to claim 3, wherein the plug member has a shank end, and the splice is at a distance in a range of at least 5 mm and at most 15 mm from the shank end, and preferably between 5 mm and 12 mm.

11. A plug connection according to claim 3, wherein the strain relief elements of the light waveguide cable are formed by reinforcing fibers selected from a group consisting of Kevlar threads and aramide yarns.

12. A plug connection according to claim 3, wherein the splice between the optical fibers is a thermal welding of the end faces of the fibers.

13. A plug connection for a light waveguide of a light waveguide cable, said connection having a plug member with a connecting light waveguide extending therefrom, the end of said connecting light waveguide being spliced to an end of a light waveguide of the light waveguide cable and at least one strain relief element of the light waveguide cable being conducted across the region of the splice and coupled to the plug member so that a strain relief is offered for the splice, said connecting light waveguide extending from the plug member with such length that the plug member and the connecting light waveguide can be placed into at least one receptacle means of a light waveguide splicing apparatus.

14. A plug connection according to claim 13, wherein a splice protection sheath is applied as a first covering layer in the region of the splice.

15. A plug connection according to claim 13, wherein the plug member has a plug shank and said strain relief elements of the light waveguide cable are pressed onto the plug shank of the plug member by a crimp sleeve.

16. A plug connection according to claim 13, which includes an anti-buckling sheath being applied outside of a ply of strain relief elements.

17. A plug connection according to claim 16, wherein the anti-buckling sheath extends at least from a plug head of the plug member up to an edge of the outside cladding of the light waveguide cable.

18. A plug connection according to claim 13, wherein the connecting light waveguide and the light waveguide of the light waveguide cable each extend from the respective plug member and cable a sufficient distance so that the splice therebetween lies outside of the zone of the plug member at a risk of buckling.

19. A plug connection according to claim 13, which includes a plug sleeve being provided to slip onto the light waveguide cable to an extent that a prescribable end section of the light waveguide cable projects at an end from the plug sleeve, wherein the plug member is a plug pin provided with the connecting optical fiber extending therefrom with a prescribable longitudinal section, the plug pin being plugged into the plug sleeve so that the plug sleeve surrounds the splice between the connecting optical fiber and the one optical fiber of the cable.

20. A plug connection according to claim 19, wherein the plug sleeve with the plug pin inserted extends approximately up to the edge of the outside cladding of the light waveguide cable.

21. A plug connection according to claim 19, wherein the plug sleeve extends approximately to the point where the strain relief elements are connected to the plug pin.

22. A plug connection according to claim 19, which includes a coupling for connection of the plug member to a plug jack being applied on the plug sleeve adjacent a pin terminal.

23. A plug connection according to claim 19, wherein the plug sleeve with the plug pin inserted therein has a longitudinal extent of the exposed sections of the spliced light waveguide and envelopes the splice and said sections from the outside.

24. A plug connection according to claim 19, wherein at least one covering sleeve of a light waveguide cable is coupled to the plug sleeve.

25. A plug connection according to claim 19, wherein a crimp sleeve is mounted on the plug sleeve on a side of the cable connection and holds the strain relief elements of the light waveguide cable fast thereto.

26. A plug connection according to claim 19, wherein a crimp sleeve is seated firmly both on the plug sleeve as well as on an outside cladding of the light waveguide cable.

27. A plug connection according to claim 19, wherein strain relief elements of the light waveguide cables are arranged on the plug sleeve, a crimp sleeve is pressed onto the plug sleeve provided with the strain relief elements, as a result whereof the strain relief elements are fixed to the plug sleeve.

28. A plug connection according to claim 19, wherein the plug pin is inserted at the end of the plug sleeve that lies opposite the light waveguide cable.

29. A method for producing a plug connection for an optical waveguide of a light waveguide cable to a plug member, comprising the steps of providing a plug member with a connecting light waveguide extending from one side thereof, releasing an end region of the optical waveguide of the cable over a prescribable length of any cladding and material of the cable so that the optical waveguide extends from the end of the cable, decoating an end section of each of the optical waveguide and the connecting light waveguide to provide exposed optical fibers, positioning the two ends of the optical fibers in alignment with each other, splicing the end faces together, conducting at least one strain relief element of the light waveguide cable across the splice to the plug member and coupling the strain relief element to the plug member so that a strain relief that bridges the splice is provided for the plug connection in the longitudinal direction.

30. A method according to claim 29, which includes, after splicing, applying a recoating material that largely corresponds to the original coating material on the spliced-together optical fibers.

31. A method according to claim 30, wherein the step of applying the recoating material applies the material essentially from a shank end of the plug member up to the outside cladding of the light waveguide cable.

32. A method according to claim 30, wherein the plug member has a shank end and the step of applying the recoating material applies the recoating material between the shank end of the plug member and the outside cladding of the light waveguide to a thickness of the outside diameter of the light waveguide cable.

33. A method according to claim 30, which includes curing the recoating material applied to the optical fibers.

34. A method according to claim 29, wherein the plug member has a shank end extending toward the splice, and prior to the step of conducting the strain relief element across the splice, recoating the optical fibers at the splice, and then conducting the strain relief element across the recoated member and connecting the element to the shank end.

35. A method according to claim 29, wherein the plug member has a shank end extending toward the splice and said step of coupling the strain relief elements to the plug member applies them on the shank member by applying a crimp sleeve thereto.

36. A method according to claim 35, which includes slipping the crimp sleeve onto the outside cladding of the light waveguide cable in advance to forming the splice.

37. A method according to claim 29, which includes slipping an anti-buckling sheath onto the outside cladding of the light waveguide cable in advance before forming the splice.

38. A method according to claim 37, which includes slipping a crimp sleeve onto the outside cladding after applying the anti-buckling sheath and before forming the splice and, subsequent to conducting the strain relief element, securing the element to the plug member by application of the crimp sleeve, and then slipping the anti-buckling sheath onto the crimp sleeve.

39. A method according to claim 29, wherein the step of removing the material from the cable to expose a portion of the optical waveguide includes removing a portion of the outside cladding of the light waveguide cable to release strain relief elements from the cable with the length of the elements being sufficient to extend from the end of the cladding to a shank of the plug member.

40. A method according to claim 29, wherein the step of providing the plug member includes forming the plug member with the connecting light waveguide extending therefrom at a factory.

41. A method according to claim 29, wherein the step of providing the plug member with the connecting light waveguide includes preparing the connecting light waveguide in advance so that it will extend out of the plug member with a sufficient length that, together with the plug, it can be placed into at least one receptacle means of a light splicing apparatus.

42. A method according to claim 29, wherein the step of removing portions of the light waveguide cable from the optical waveguide releases the optical waveguide over a great extent so that the exposed optical waveguide section can be placed into at least one receptacle of a light waveguide splicing apparatus.

43. A method according to claim 29, which includes providing a splice protection sheath by slipping it over an exposed optical fiber after forming the splice.

44. A method according to claim 43, which includes providing a shrink hose as a shrink protection sheath said shrink hose being shrunken over the splice and over the exposed longitudinal sections of the optical fibers adjacent the splice.

45. A method according to claim 43, wherein the splice protection sheath is slipped onto an end section of the connecting light waveguide extending out of the plug member in advance before preparation of the end face.

46. A method according to claim 29, which includes slipping a crimp sleeve over the connecting light waveguide extending from the plug member in advance before preparation of the end face.

47. A method according to claim 46, wherein the step of securing the strain relief elements includes securing the strain relief elements to the plug member by attaching the crimp sleeve thereto.

48. A method according to claim 29, which includes, after forming the splice, supporting the light waveguide cable and the plug member in an auxiliary assembly means to hold the spliced-together optical fibers in a straight line.

49. A method according to claim 29, wherein the step of providing the waveguide extending from the cable and from the plug means provides a length greater than the length of the strain relief elements being conducted over the splice region.

50. A method according to claim 29, wherein the step of providing a plug member provides a plug pin having the connecting optical fiber extending therefrom, said method including the steps of slipping a plug sleeve onto the light waveguide cable so that the free end of the optical waveguide of the light waveguide cable extends therefrom, said step of splicing the fibers connects the optical fiber extending from the plug pin with the end of the optical fiber of the cable with the ends being outside of the plug sleeve and outside of the plug pin, and, after splicing, includes pushing the plug sleeve over the splice region and inserting the plug pin into an end of the plug sleeve.

51. A method according to claim 50, wherein the step of providing the plug pin provides a ferrule.

52. A method according to claim 50, wherein the step of conducting the reinforcing element conducts the reinforcing element over the plug sleeve and connects the element to the plug sleeve.

53. A method according to claim 50, wherein the step of pushing the plug sleeve over the splice region maintains a portion of the plug sleeve enveloping a sub-section of the outside cladding of the light waveguide cable adjacent the splice.

54. A method according to claim 50, wherein the step of pushing the plug sleeve over the splice pushes it a sufficient distance so that the end adjacent the cladding of the waveguide cable terminates in the region of the cladding where the strain relief elements emerge from the cable structure of the light waveguide cable.

55. A method according to claim 50, wherein the step of conducting the strain relief element conducts the strain relief element outside and over the plug sleeve.

56. A method according to claim 55, which includes slipping a crimp sleeve onto the outside of the plug sleeve with the strain relief elements provided therebetween, pressing the crimp sleeve onto the plug sleeve to secure the strain relief elements thereto.

57. A method according to claim 56, which includes moving the crimp sleeve onto the outside cladding of the light waveguide cable in advance before the step of splicing the fibers together.

58. A method according to claim 50, which includes slipping an anti-buckling sheath onto the outside cladding of the light waveguides in advance before splicing.

59. A method according to claim 58, which includes slipping the anti-buckling sheath over the plug sleeve up to a plug head of the plug sleeve.

60. A method according to claim 50, wherein the step of splicing includes fusion-welding the ends of the optical fibers.

* * * * *